(12) United States Patent
Amaro

(10) Patent No.: US 7,748,205 B2
(45) Date of Patent: Jul. 6, 2010

(54) HARVESTING MACHINE AND METHOD OF HARVESTING POMEGRANATES AND CITRUS

(75) Inventor: Vernal A. Amaro, Fresno, CA (US)

(73) Assignee: MAA, LLC, San Mateo, CA (US)

( * ) Notice: Subject to any disclaimer, the term of this patent is extended or adjusted under 35 U.S.C. 154(b) by 0 days.

(21) Appl. No.: 12/378,421

(22) Filed: Feb. 13, 2009

(65) Prior Publication Data

US 2010/0050585 A1   Mar. 4, 2010

Related U.S. Application Data

(60) Provisional application No. 61/190,410, filed on Aug. 28, 2008.

(51) Int. Cl.
*A01D 46/00* (2006.01)

(52) U.S. Cl. .................................. 56/328.1

(58) Field of Classification Search ............... 56/328.1, 56/329, 330, DIG. 19
See application file for complete search history.

(56) References Cited

U.S. PATENT DOCUMENTS

| | | | |
|---|---|---|---|
| 3,184,908 A | | 5/1965 | Rust |
| 3,485,025 A | | 12/1969 | Bohannon |
| 5,067,314 A | * | 11/1991 | Burke ........................ 56/330 |
| 5,113,644 A | | 5/1992 | Windemuller et al. |
| 5,259,177 A | | 11/1993 | Windemuller et al. |
| 5,339,612 A | * | 8/1994 | Scott ........................ 56/330 |
| 5,495,708 A | * | 3/1996 | Scott et al. .................... 56/329 |
| 5,666,795 A | | 9/1997 | Wilkinson |
| 5,921,074 A | * | 7/1999 | Scott et al. .................... 56/330 |
| 5,956,933 A | * | 9/1999 | Heard ........................ 56/329 |
| 5,966,915 A | | 10/1999 | Crunkelton |
| 6,145,291 A | * | 11/2000 | Jarmain ...................... 56/330 |
| 6,901,731 B2 | * | 6/2005 | Scott et al. .................... 56/330 |
| 2005/0034441 A1 | | 2/2005 | Porta et al. |
| 2007/0012018 A1 | * | 1/2007 | Pellenc et al. ............. 56/328.1 |
| 2008/0034726 A1 | | 2/2008 | Bonadeo |

OTHER PUBLICATIONS

Revolutionary Mechanical Citrus Harvester Picks Fruit Faster, Cheaper, Internet, Oct. 6, 2008, 1 page, U.S.

(Continued)

*Primary Examiner*—Árpád Fábián-Kovács
(74) *Attorney, Agent, or Firm*—Richard A. Ryan

(57) ABSTRACT

A crop harvesting machine configured to separate crop, particularly pomegranates, from a tree by straddling the tree as the machine moves along a row of trees. The machine has an inverted u-shaped main frame that supports a sub-frame that defines a harvesting area configured to receive the canopy of a tree therein. A motor supported by the main frame propels the machine along the row of trees. A pair of picking assemblies supported by the sub-frame each comprise a crop separating mechanism having a plurality of rods configured to engage the tree canopy and separate the crop from the tree, a motion inducing mechanism to impart a short duration, snap-like whipping motion to the rods and a canopy engaging mechanism to move the rods in and out of the canopy. An operator area allows the operator to drive the machine along the row of trees and operate the various mechanisms.

20 Claims, 12 Drawing Sheets

OTHER PUBLICATIONS

Oxbo Citrus Harvester Specifications, Oxbo Citrus, Internet, Oct. 7, 2008, 2 pages, U.S.
Oxbo Citrus Harvester Features, Oxbo Citrus, Internet, Oct. 7, 2008, 2 pages. U.S.
Mechanicial Citrus Harvesting Has Potential, But Still Not Many Takers, The Ledger.com, Internet, Oct. 7, 2008, 5 pages, U.S.
Another Valley First, The Business Journal, Jan. 16, 2009, 2 pages, U.S.

* cited by examiner

HARVESTING MACHINE AND METHOD OF HARVESTING POMEGRANATES AND CITRUS

CROSS-REFERENCE TO RELATED APPLICATIONS

This patent application claims priority to U.S. Provisional Patent Application No. 61/190,410 filed Aug. 28, 2008.

STATEMENT REGARDING FEDERALLY SPONSORED RESEARCH

Not Applicable.

BACKGROUND OF THE INVENTION

A. Field of the Invention

The field of the present invention relates generally to mechanical harvesters for use in harvesting crops. More specifically, the present invention relates to such harvesters that move along the ground and are particularly useful for harvesting of tree-borne crops grown in rows of trees. Even more specifically, the present invention relates to such mechanical harvesters that utilize a plurality of oscillating rods to separate the crop from the tree and are particularly beneficial for harvesting pomegranates, citrus and the like.

B. Background

The growing of pomegranate trees and the harvesting of its fruit originated in area of ancient Persia and spread through out the Mediterranean and Black Sea regions, where it has been cultivated for several millennia. From there, cultivation of the pomegranate spread throughout India and the drier parts of Asia, East Indies and Africa. Spanish colonist introduced the pomegranate to the Caribbean, Latin America and, in approximately 1769, California. In the United States, the pomegranate is primarily grown for its fruit in the drier parts of California and Arizona. Although pomegranates have been grown as a source of food, for ornamental purposes and for religious purposes for many thousands of years, only recently has the popularity of the fruit substantially increased and, as a result, the fruit is now widely distributed. The primary reason for the upsurge in popularity of pomegranates, generally as a juice or juice extract, has to do with its health benefits. Recent studies indicate that pomegranate fruit is a good source of vitamins, particularly vitamin C and $B_5$, potassium and antioxidants and that it can reduce heart disease risk factors and lower blood pressure. Other studies indicate pomegranate juice may reduce the likelihood of certain cancers and diabetes and that it has potential antiviral and antibacterial benefits. As a result of the demand for pomegranate juice and for products having pomegranate as an ingredient, there has been a substantial increase in pomegranate planting and harvesting.

The pomegranate tree, which is in the form of a large, generally rounded shrub-like small tree, typically grows twelve to sixteen feet in height with one or more trunks that produce limbs from which extend secondary laterals that are generally stiff and very spiny. The pomegranate fruit grows directly from the secondary laterals. As well known, the pomegranate fruit is not easily separated from the secondary lateral. Because of this, and the fact that the pomegranate tree trunk is not very strong, shaking the trunk (like is done for many varieties of nuts) or the tree generally is not a useful method of harvesting pomegranates. In fact, due to the difficulties of separating the fruit from the tree, presently there is no machine for or mechanical method of harvesting pomegranates. Instead, the conventional method of harvesting pomegranates is very labor intensive. As a result, to grow and harvest pomegranates in a large scale, commercial manner requires a significant number of laborers to separate the crop from the tree. The present method of harvesting pomegranates requires laborers to walk through the rows of trees, reach inside a tree to grasp an individual fruit and then pull on the fruit to separate it from the tree. Due to the thorns and the difficulty in separating the stem from the laterals, this is a time consuming and costly process for the grower and potentially painful for the laborer. As well known in the agricultural industry, there are many issues with regard to the availability of laborers, many of whom have traditionally been in this country illegally or otherwise without proper documentation, and the cost of paying those laborers. As with many crops, it is generally necessary to have a large number of skilled workers available at the time when the pomegranates are ready to be harvested. If they are not available when needed, the crop may be lost. As a result, the cost and availability of labor for pomegranate harvesting threatens to limit the ability to grow pomegranates on a large scale, commercially viable manner.

Harvesting of citrus as many of the same attributes and issues as identified above for pomegranates. One difference with regard to the mechanical harvesting of citrus, particularly oranges, is that care must be taken to separate the fruit from the tree to avoid causing the stem to pull the cap off of the skin and, thereby, leave a hole into the fruit. As a result of this problem, mechanical harvesting of citrus is primarily done for fruit that is harvested for the juice market or when it is necessary to remove fruit that has been damaged by a freeze or other event. For certain fresh fruit markets, some people may be willing to accept the cap removal damage done to the fruit by mechanical harvesting in exchange for the cost savings attributable to mechanical harvesting. In addition, over time certain fruit trees may be genetically modified to provide fruit that does not remove the cap of the skin when separated from the tree.

As well known to those skilled in the art, many different types of mechanical harvesters have been developed to harvest fruit. Due to various limitations and problems, very few of these machines are commercially available or in use by growers. A successful mechanical harvesting machine for harvesting fruit from trees must be able to efficiently and effectively move to and about the orchard from which the fruit will be harvested, move from one tree to another tree and move from one row of trees to another row. The harvesting machine must also be able to harvest the fruit from substantially the entire tree, including the top, bottom and middle of the tree, in order to avoid having to hand pick much, if any, of the remaining fruit on the tree. The harvesting machine must also be configured to not damage the tree, including breakage of limbs and trunks, or the fruit, as applicable, that is removed from tree. Preferably, a harvesting machine for picking fruit from trees will be able to move along a row of trees and harvest fruit from each tree while stopping for as short of time as possible at the tree so as to limit the amount of time required for harvesting to as little as possible.

Over the years, various attempts have been made to provide a harvesting machine to mechanically harvest citrus. For instance, U.S. Pat. No. 3,485,025 to Bohannon describes a mechanical citrus fruit harvester having a harvesting head mounted on a support platform with a plurality of harvesting fingers projecting from the harvesting head that are vibrated vertically and horizontally to engage and remove fruit from within a tree. A telescoping chute transfers the removed fruit to a conveyor mechanism that transfers the fruit to a bin or other container. U.S. Pat. No. 5,666,795 to Wilkinson describes a citrus harvesting machine having a plurality of outwardly extending picking arms carried on a driver bar that is moved toward and away from the tree so the picking arms may selectively penetrate the tree canopy. The picking arms have a generally hook-shaped picking member at their distal end that separates the fruit from the branch during retraction of the picking arms. A drive mechanism applies a cyclic motion to the individual picking arms to assist in dislodging the fruit from the tree. A more recent mechanical citrus harvesting machine, available from Oxbo Corp., is a continuous travel canopy shaker that has a plurality of outward extending tines disposed in a generally circular pattern which are inserted into one side of the tree's canopy and then shaken to dislodge the fruit from the tree. A pair of the machines are moved along the open spaces on either side of a row of trees to remove fruit from trees in the row by rapidly shaking the tines inside the canopy. A number of workers, such as 25 to 30, follow behind the harvester to collect the fruit that is knocked onto the ground by the harvester.

Despite the foregoing, what is needed is a harvesting machine and method of harvesting that effectively separates pomegranate and citrus fruit from the tree without damaging the tree or the fruit so that the pomegranates and citrus can be harvested in a more commercially acceptable and efficient manner. A desirable harvesting machine and method is one that is particularly beneficial for harvesting crops grown on trees having crops, such as pomegranates, that are generally difficult to remove by hand and cannot be safely, efficiently or effectively removed by shaking the trunk of the tree. Preferably, a harvesting machine and method would allow harvesting of the crop to take place as quickly and efficiently as possible with a low number of laborers and less wasted time and effort so as to facilitate the commercial cultivation of pomegranates and citrus by reducing the overall cost of such harvesting. The desired harvester and method of harvesting should be able to harvest virtually all or the vast majority of the crop off of the tree in order to reduce the need for follow-up hand harvesting. The preferred harvester and method of harvesting should substantially eliminate the need to collect fruit off of the ground.

SUMMARY OF THE INVENTION

The harvesting machine and method of harvesting pomegranates and citrus of the present invention solves the problems and provides the benefits identified above. That is to say, the present invention discloses a new and improved harvesting machine that is particularly configured to effectively and efficiently harvest pomegranates and citrus from trees disposed in a row. More specifically, the harvesting machine and method of the present invention allows the crop to be quickly harvested with only a few workers and much less wasted time and effort, thereby facilitating the commercial cultivation of pomegranates and citrus. The harvesting machine of the present invention is configured as an over-the-row harvester that enables the harvesting machine to move along a row of trees to harvest fruit from the trees while only stopping for a very short time at each tree. The preferred harvesting machine is configured with a frame that supports a crop dislodging mechanism which separates the vast majority of the fruit from the tree, thereby reducing the need for follow-up hand removal, without damaging the tree and without damaging the fruit, with regard to pomegranates, or only acceptably damaging citrus (i.e., cap removal). The crop dislodging mechanism is moveably disposed in an open harvesting area of the harvesting machine. In performing a preferred embodiment of the method of the present invention, the user drives the harvester from one tree to another along a row of such trees, operates a tree engaging mechanism to move the crop dislodging mechanism into engagement with the canopy of the tree, operates an oscillating mechanism to quickly oscillate a portion of crop dislodging mechanism to separate the fruit from the tree and then conveys the fruit to a bin or other container.

In a primary embodiment of the present invention, the harvesting machine comprises a main support frame configured to substantially straddle a tree as the harvesting machine moves along a row of trees, a primary sub-frame supported by the main support frame that defines a harvesting area between a pair of side frames interconnected by an overhead frame, a motor supported by the main support frame to drive one or more wheels over the ground along the row of trees and a picking assembly on each of the side frames to selectively engage the canopy of the tree when it is disposed inside the harvesting area and to separate the crop from the tree. Each of the picking assemblies have a crop separating mechanism, a motion inducing mechanism and a canopy engaging mechanism. The crop separating mechanisms have a plurality of outwardly extending elongated rods that are mounted on a rod support frame so as to be flexibly supported thereby. The motion inducing mechanism is configured to impart a short duration, snap-like whipping motion to the rods to separate the crop from the tree. The canopy engaging mechanism is configured to move the harvesting machine between a tree engaging position where the rods are directed substantially into the harvesting area to engage the canopy of the tree when the tree is disposed in the harvesting area and an open position where the rods are substantially retracted from the harvesting area after the crop is separated from the tree for movement of the harvesting machine along the row of trees. In a preferred embodiment, the motion inducing mechanism comprises one or more weight assemblies, comprising a weight member attached to a rotating shaft, that are configured to impart the desired whipping motion to the rods. One or more weight offset members can be utilized to interconnect the weight member and the shaft so as to eccentrically dispose the weight member about the shaft. The preferred motion inducing mechanism has a pair of weight assemblies and the motion inducing mechanism is configured for non-uniform rotation of the pair of weight assemblies. In a preferred embodiment, the canopy engaging mechanism comprises one or more slider members that are each slidably supported on a corresponding slider support member that is supported by the primary sub-frame. Preferably, each slider member is attached to a carrier frame that is configured to support the crop separating mechanism. A ram mechanism, disposed between a carrier brace member of the carrier frame and a slider brace member connecting a pair of spaced apart slider support members, is utilized to move the carrier frame and crop separating mechanism. The preferred harvesting machine also includes a conveying assembly that is attached to and supported by the main support frame to receive the crop separated from the tree and transfer the crop to a storage container, such as bin. Preferably, the conveying assembly comprises a lower conveyor that receives the crop and moves it rearward, a rear conveyor that moves the separated crop upward towards the top side of the harvesting machine and a transfer conveyor that is configured to transfer the crop above the tree to a bin being towed by a tractor or other vehicle in the space adjacent the row of trees. An operator area supported by the main support frame has one or more seats for the operator and a steering wheel and control mechanism to allow a single operator to direct and control the harvesting machine. In a preferred embodiment, the harvesting machine further comprises a front wheel assembly and a lift mechanism connecting the front wheel assembly to the support frame to allow the operator to raise and lower the support frame, and therefore the crop separating mechanism, in relation to the front wheel assembly.

A method of harvesting crop, such as pomegranates, utilizing the harvesting machine of the present invention comprises the steps of positioning the harvesting area in alignment with the row of trees with the harvesting machine in its open position (the rods retracted from the harvesting area), moving the harvesting machine forward to position the canopy of the tree in the harvesting area, operating the canopy engaging mechanism to move the rods of the crop separating mechanism into the canopy of the tree to place the harvesting machine in its tree engaging position, activating the motion inducing mechanism to impart a short duration, snap-like motion to the rods to cause the rods to oscillate or whip inside the canopy and separate the crop from the tree, collecting the crop on a conveying assembly and moving it toward a storage container, such as a bin, with the conveying assembly, operating the crop engaging mechanism to move the rods of the crop separating mechanism out of the canopy, and then moving the harvesting machine forward along the row of trees while straddling the tree.

Accordingly, the primary objective of the present invention is to provide a harvesting machine and method of harvesting pomegranates and citrus that has the benefits described above and which overcomes the limitations and problems associated with currently available harvesting machines and methods for such crops.

It is a primary objective of the present invention to provide a harvesting machine and method that significantly reduces the amount of labor required to harvest pomegranates and citrus, thereby solving problems related to the supply and cost of such labor.

It is also a primary objective of the present invention to provide a harvesting machine and method that facilitates growing pomegranates in a large scale commercial manner by significantly reducing the amount of labor, time and cost for harvesting such crop.

It is also a primary objective of the present invention to provide a harvesting machine configured as an over-the-row harvester that enables the harvesting machine to move along a row of trees to harvest fruit from the trees while only stopping for a very short time at each tree.

It is also a primary objective of the present invention to provide an over-the-row harvesting machine and method of using such machine that imparts a snap-like rapid oscillation motion to a plurality of rods that extend into the canopy of a tree to separate fruit from the tree.

It is also an important objective of the present invention to provide a harvesting machine and method of harvesting pomegranates and citrus that does not require the shaking of the tree trunk or the individual grasping and removing of the fruit in order to harvest the fruit.

Another important objective of the present invention is to provide a harvesting machine and method of harvesting pomegranates and citrus that can be manufactured in a cost effective manner.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are merely illustrative of one or more of the preferred embodiments and, as such, represent one or more ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein are directed to components that are generally made out of conventional and readily available materials, those skilled in the art will readily understand that this is set forth merely for purposes of simplifying the present disclosure and that the present invention is not so limited.

Figure 3:
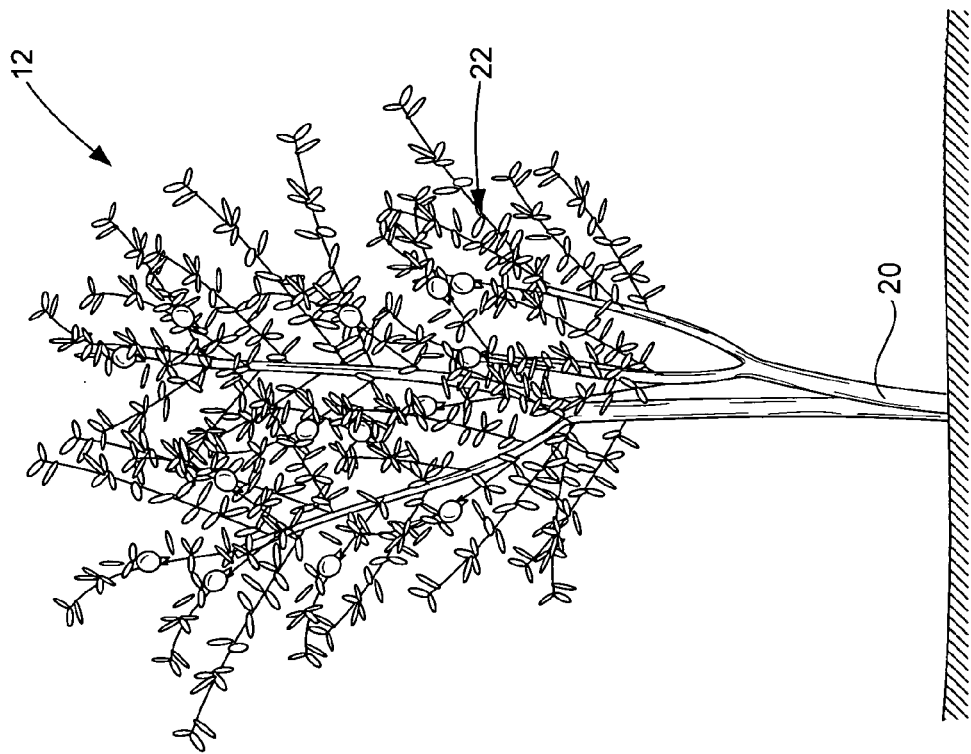
FIG. 3 is a front view of a pomegranate tree.

A harvesting machine that is manufactured out of the materials and configured pursuant to a preferred embodiment of the present invention is shown generally as 10 in FIGS. 1 and 4 through 8. As set fort in the Background above and shown in FIGS. 2 and 3, pomegranates grow on tree 12 that has a generally rounded, shrub-like profile with the pomegranate fruit 14 attached to secondary laterals 16 that extend from the limbs 18 of the tree 12. Unfortunately, at least for harvesting purposes, the secure attachment of fruit 14 to the secondary laterals 16 does not allow the use of harvesting machines that are configured to grasp and shake the trunk 20 of tree 12. Even if the trunk 20 of tree 12 could be shaken without risk of damaging the tree 12, shaking the trunk 20 would not separate much of the fruit 14 from the secondary laterals 16 due to how securely the fruit 14 is attached. Any shaking of the trunk 20 would merely cause the fruit 14 to swing on the end of the laterals 16. Instead of shaking the trunk 20 of tree 12, the harvesting machine 10 of the present invention has a plurality of elongated components that extend into the canopy 22 of the tree 12 to provide a snap-like shaking action that breaks the connection between the fruit 14 and secondary lateral 16 so that the fruit 14 may be harvested from the tree 12. As explained in more detail below, these components shake the tree 12 closer to where the fruit 14 connects to laterals 16. Because the shaking action is closer to the fruit 14, a short duration, snap-like shaking action is sufficient to separate the fruit 14 from the lateral 16.

Figure 1:
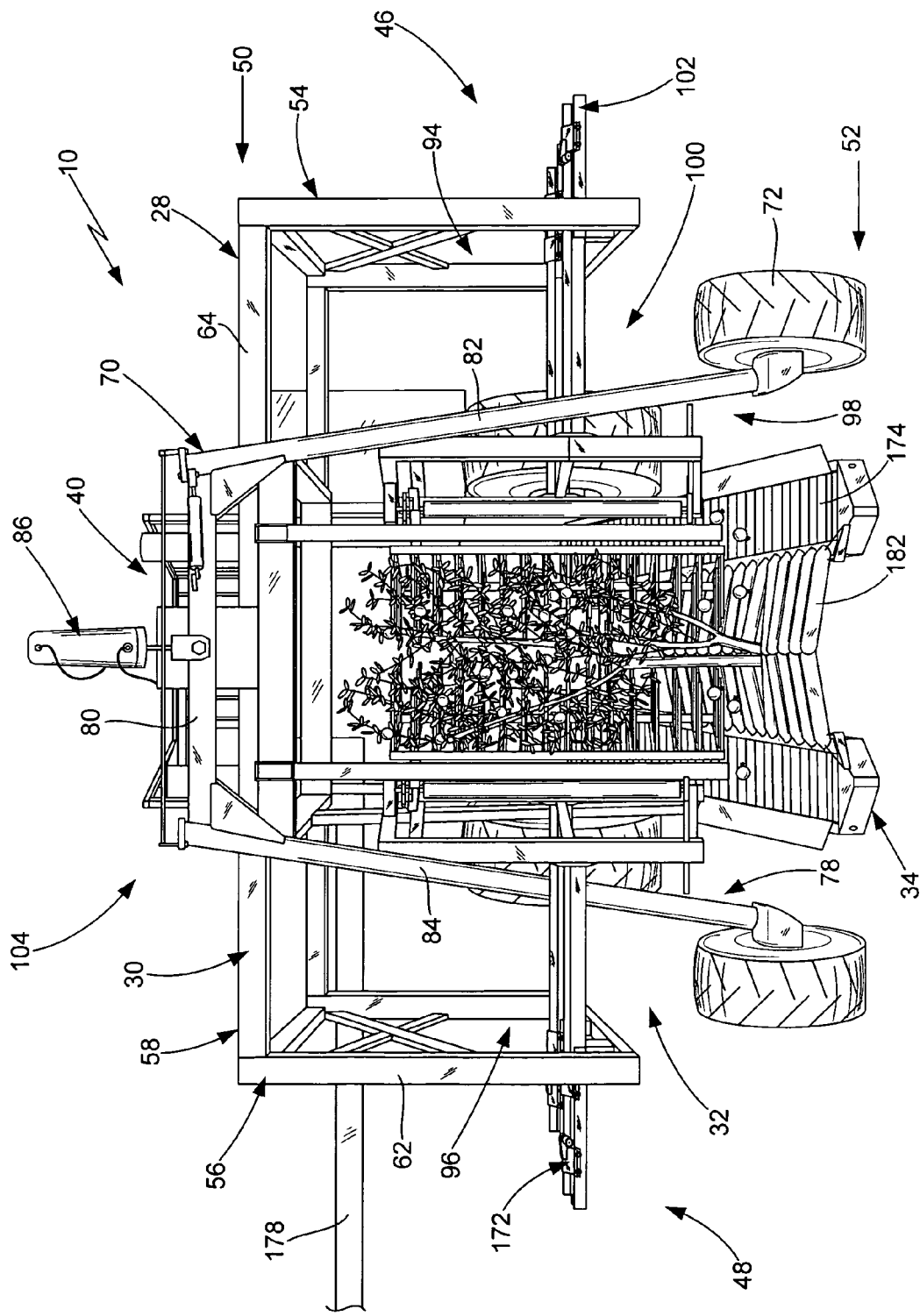
FIG. 1 is front perspective view of a harvesting machine configured according to a preferred embodiment of the present invention shown in use in its tree engaging position harvesting pomegranates from a pomegranate tree.
Figure 2:
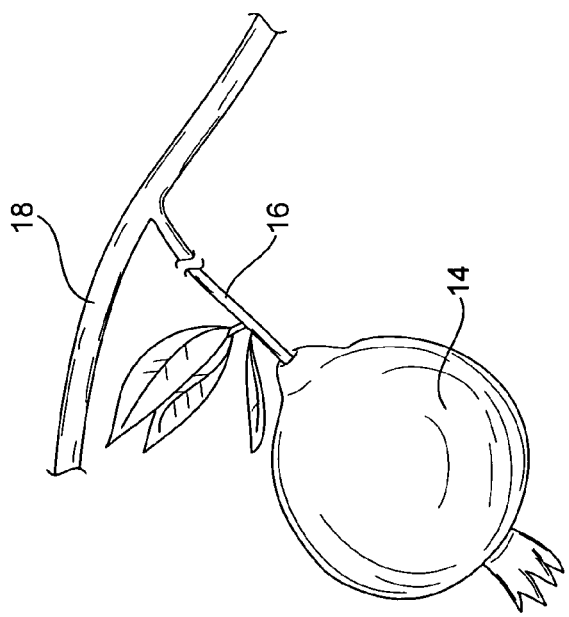
FIG. 2 is an isolated view of a pomegranate growing on a pomegranate tree to illustrate the relevant parts thereof.
Figure 12:
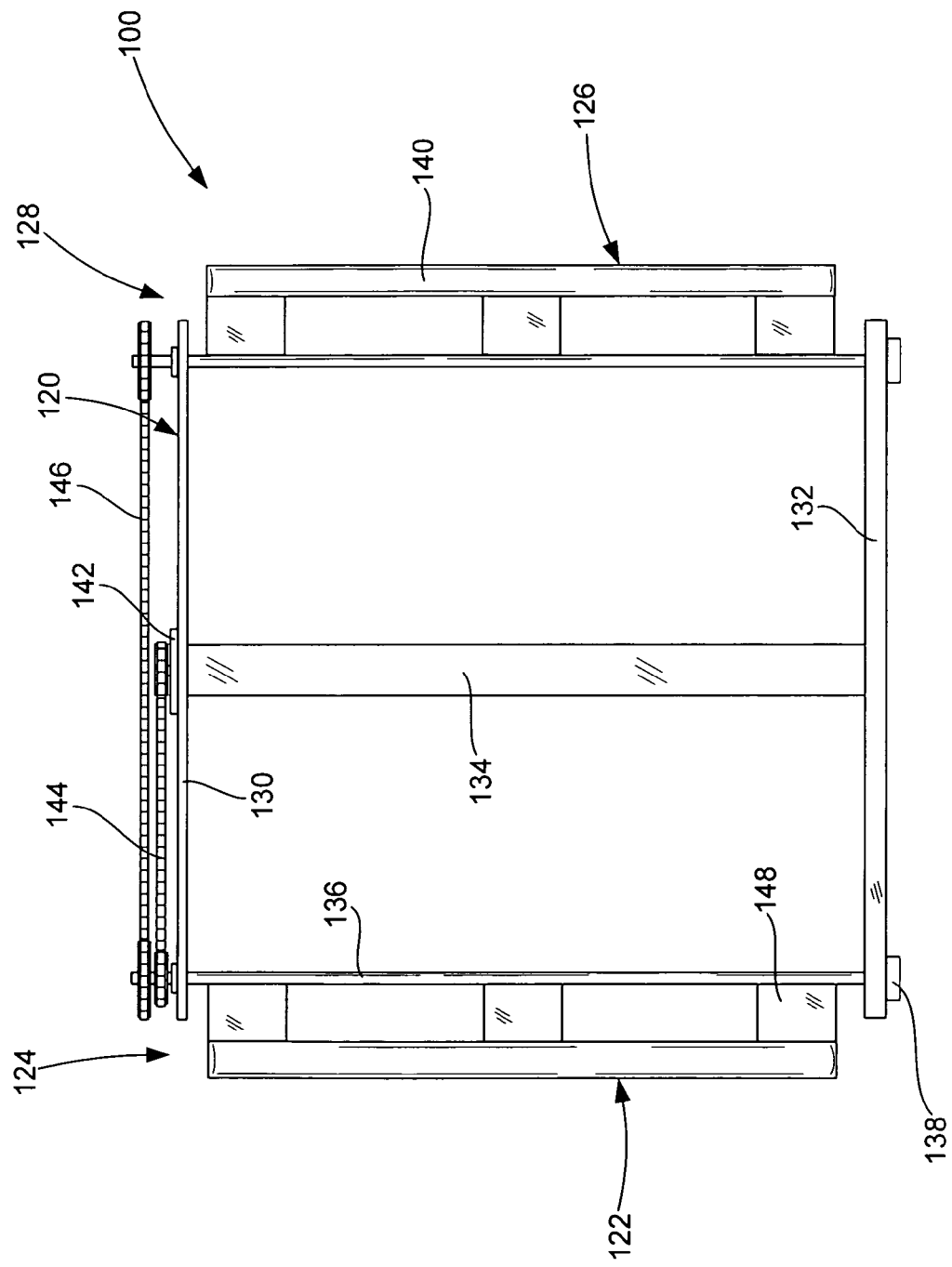
FIG. 12 is an isolated side view of the motion inducing mechanism utilized with the preferred embodiment of the harvesting machine of the present invention.
Figure 14:
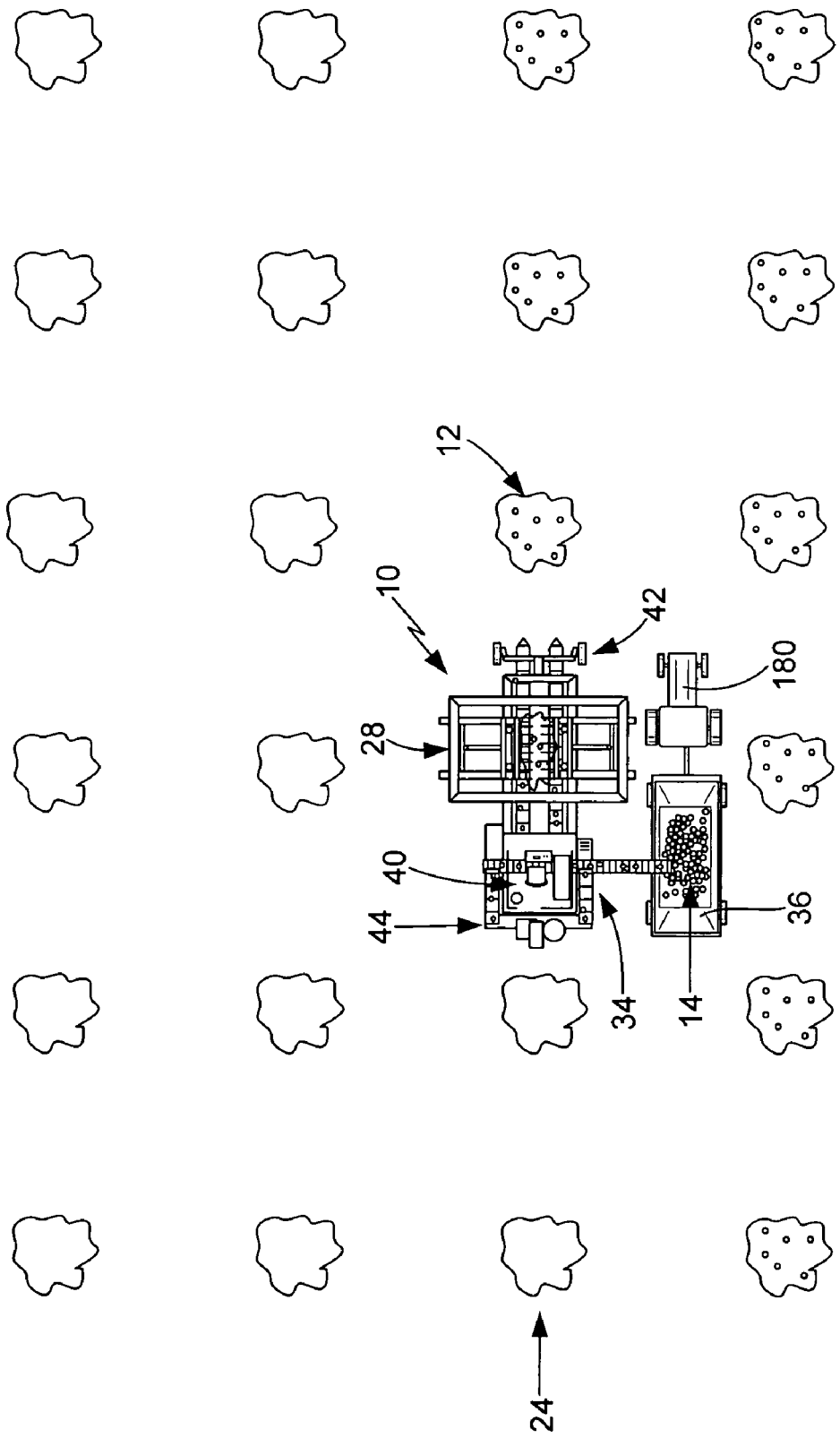
FIG. 14 is an aerial view of the harvesting machine of the present invention harvesting one row of a plurality of rows of trees.

As best shown in FIGS. 1, 12 and 14, in a preferred embodiment the harvesting machine 10 is configured to straddle the trees 12 as it moves along a row 24 of trees 12, stop at one of the trees 12, insert a plurality of elongated, generally stiff rods 26 into the canopy 22 of tree 12, rapidly whip rods 26 against the secondary laterals 16 and limbs 18 to separate (by shaking) the fruit 14 from tree 12, retract the rods 26 from canopy 22 of tree 12 and then move machine 10 to the next tree in the row 24 to remove the fruit 14 therefrom. To accomplish the above, harvesting machine 10 generally comprises an inverted u-shaped main support frame 28 that straddles the tree 12, a primary sub-frame 30 connected to and supported by the main support frame 28, a picking mechanism 32 supported by the primary sub-frame and configured to selectively oscillate the rods 26 to separate the fruit 14 from tree 12, a conveying assembly 34 configured to convey the dislodged fruit 14 to a storage container, such as bin 36, one or more power sources, including motor 38, to provide power to propel the harvesting machine 10 to and along row 24 and operate the various moving and shaking components of harvesting machine 10, and an operator area 40 that is configured to allow a single operator to operate harvesting machine 10, as best shown in FIGS. 1, 4 through 8 and 14. As also shown in these figures, harvesting machine 10 has a front end 42, a back end 44, a left or first side 46 (viewed from behind the machine 10 in the direction of the operator when he or she operates machine 10), a right or second side 48, a top side 50 and a bottom 52, which are utilized in the description below to identify the position of the various components of harvesting machine 10. As will be readily apparent to those skilled in the art, main support frame 28 is substantially open in the center thereof between the first side 46 and the second side 48 from front end 42 to back end 44 so the harvesting machine 10 may straddle tree 12 as it moves along the row 24 of trees 12.

Figure 4:
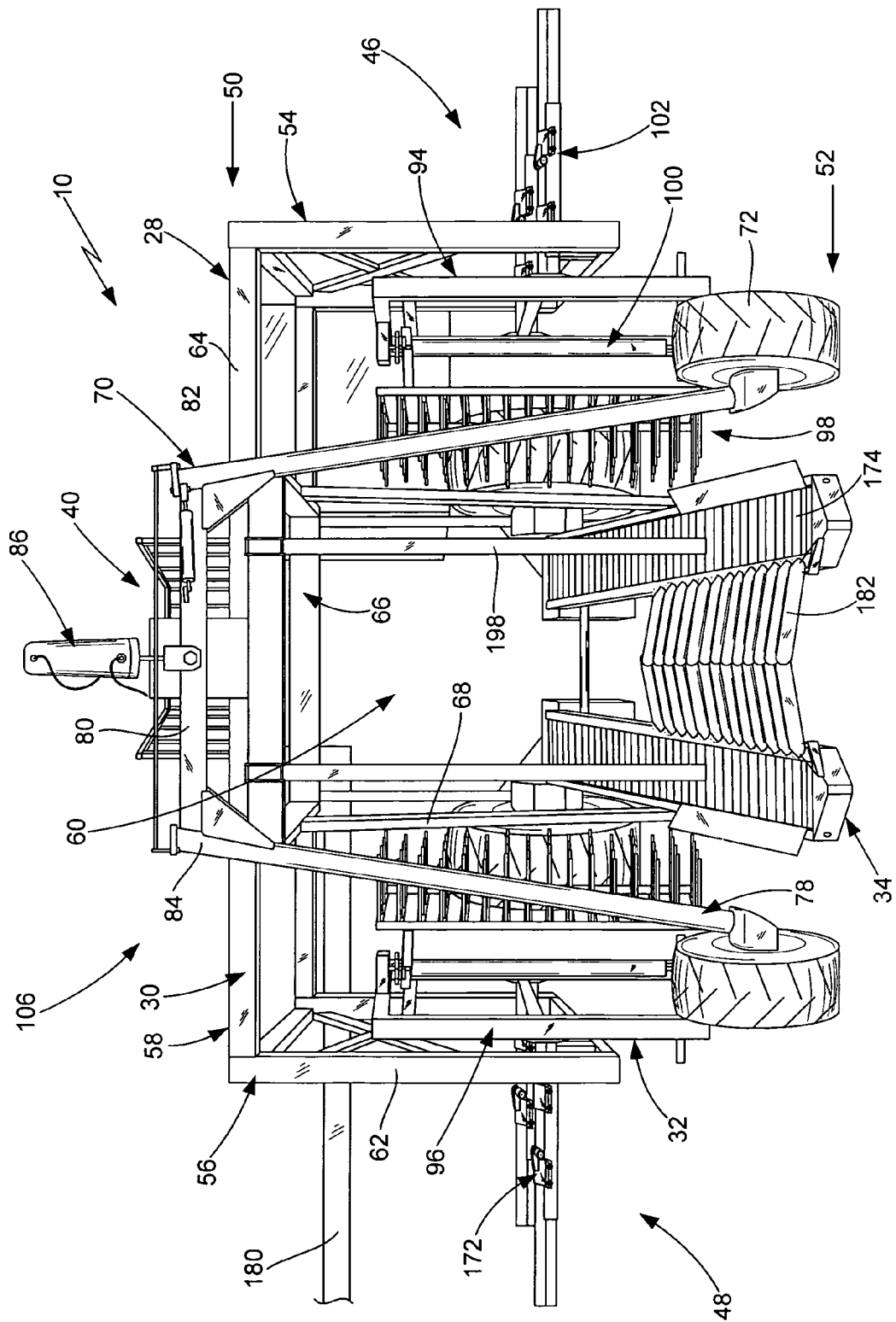
FIG. 4 is a front view of the harvesting machine of FIG. 1 shown in its open position without the tree.
Figure 6:
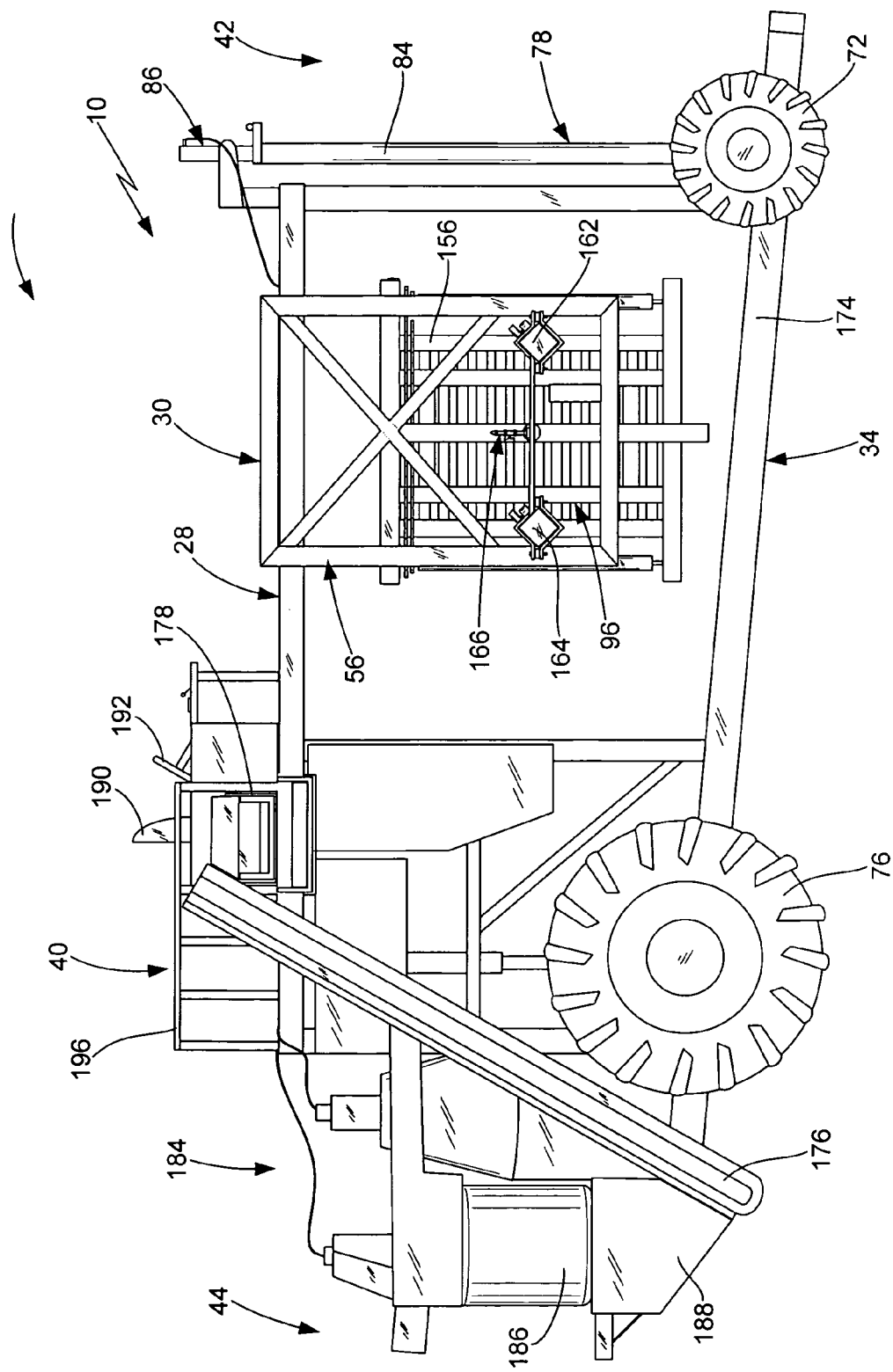
FIG. 6 is a side view of the left or first side of the harvesting machine of FIG. 4.
Figure 7:
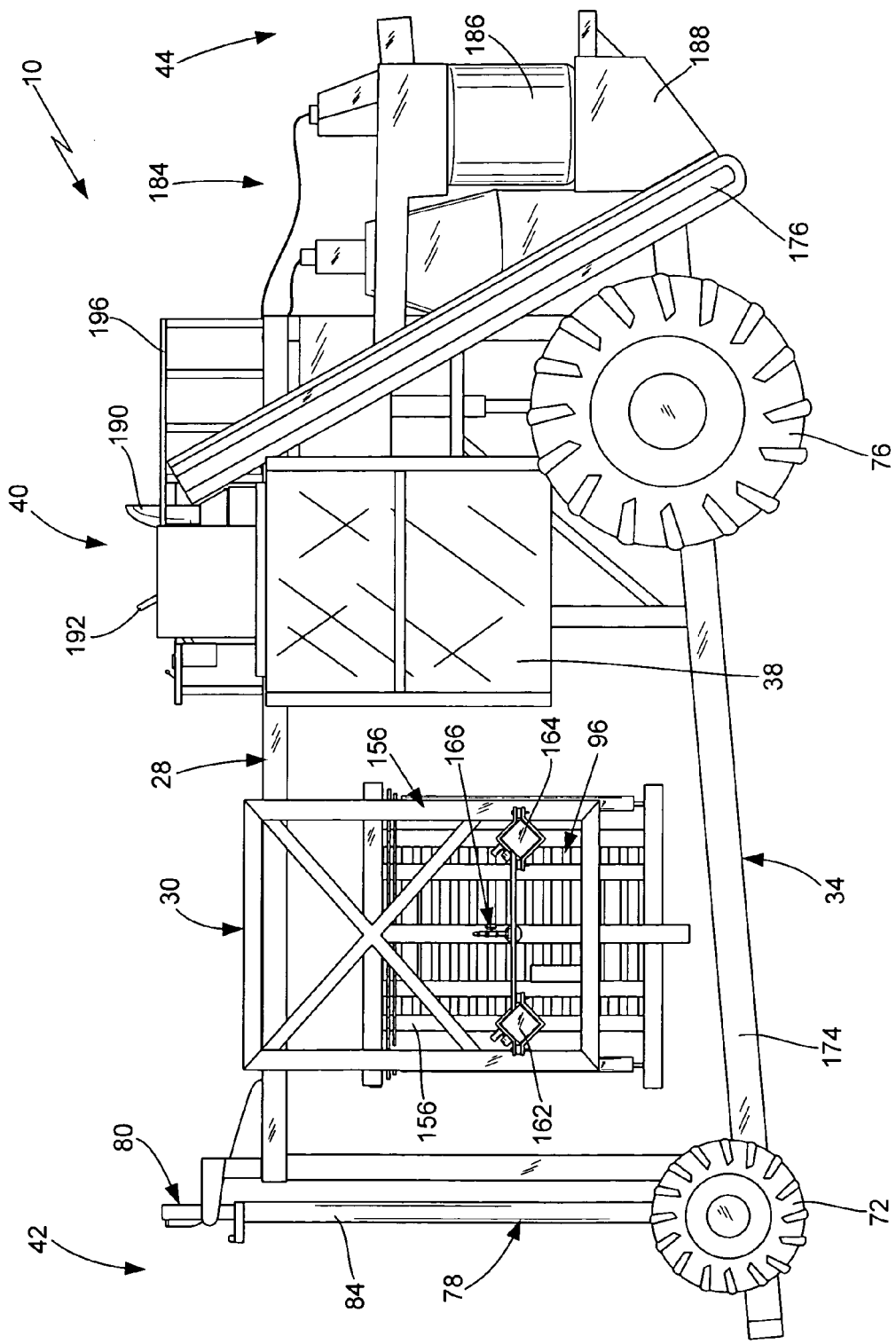
FIG. 7 is a side view of the right or second side of the harvesting machine of FIG. 4 particularly showing the rear conveyor and operator area.
Figure 8:
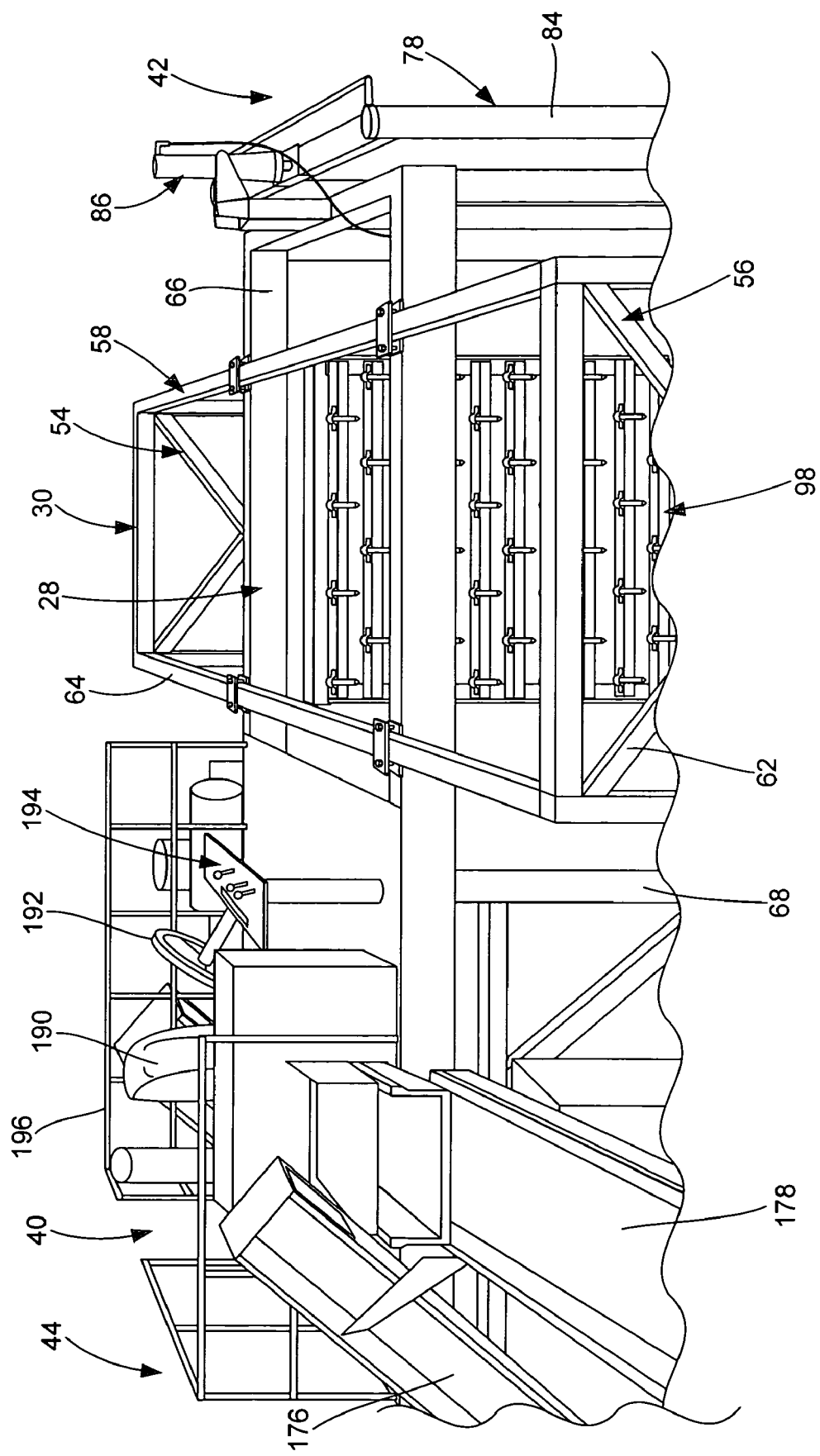
FIG. 8 is a top perspective view of the harvesting machine of FIG. 4 particularly showing the main support frame and operator area.

As best shown in FIGS. 4, 6 and 7, primary sub-frame 30 comprises a first side frame 54 at the first side 46 of machine 10, a second side frame 56 at the second side 48 of machine 10 and an overhead frame 58 that interconnects the first side frame 54 and the second side frame 56, also in a generally inverted u-shaped configuration, to define a substantially open harvesting area 60 that is generally disposed at or near the center of harvesting machine 10. As best shown in FIG. 1, the primary sub-frame 30 and harvesting area 60 are sized and configured such the canopy 22 portion of tree 12 is received in the harvesting area 60, when harvesting machine 10 is in use so the picking mechanism 32 may be operated to engage the canopy 22 of tree 12 and separate fruit 14 from tree 12. Each of the first 54 and second 56 side support frames are made up of one or more side frame members 62, typically a plurality, that connect to and support, as set forth below, a portion of the picking mechanism 32. In the preferred embodiment, overhead frame 58 comprises a pair of spaced apart overhead frame members 64 that are attached to and supported above a center support, frame 66 of main support frame 28, as best shown in FIG. 8, at a position that is generally at or near the center of harvesting machine 10 above harvesting area 60. Extending downward from the center support frame 66 are one or more conveyor frame members 68 that interconnect the center support frame 66 to the portion of the conveying assembly 34 disposed at the bottom 52 of harvesting machine 10 generally below harvesting area 60. As with other harvesting machines, the various frame components of the main support frame 28 are preferably made out of metal that is sized and configured to safely support the various components of harvesting machine 10, are painted, coated or otherwise treated to reduce the likelihood of corrosion and are joined together utilizing connectors and connecting techniques, such as welding or the like, that is appropriate for the materials being utilized.

Figure 5:
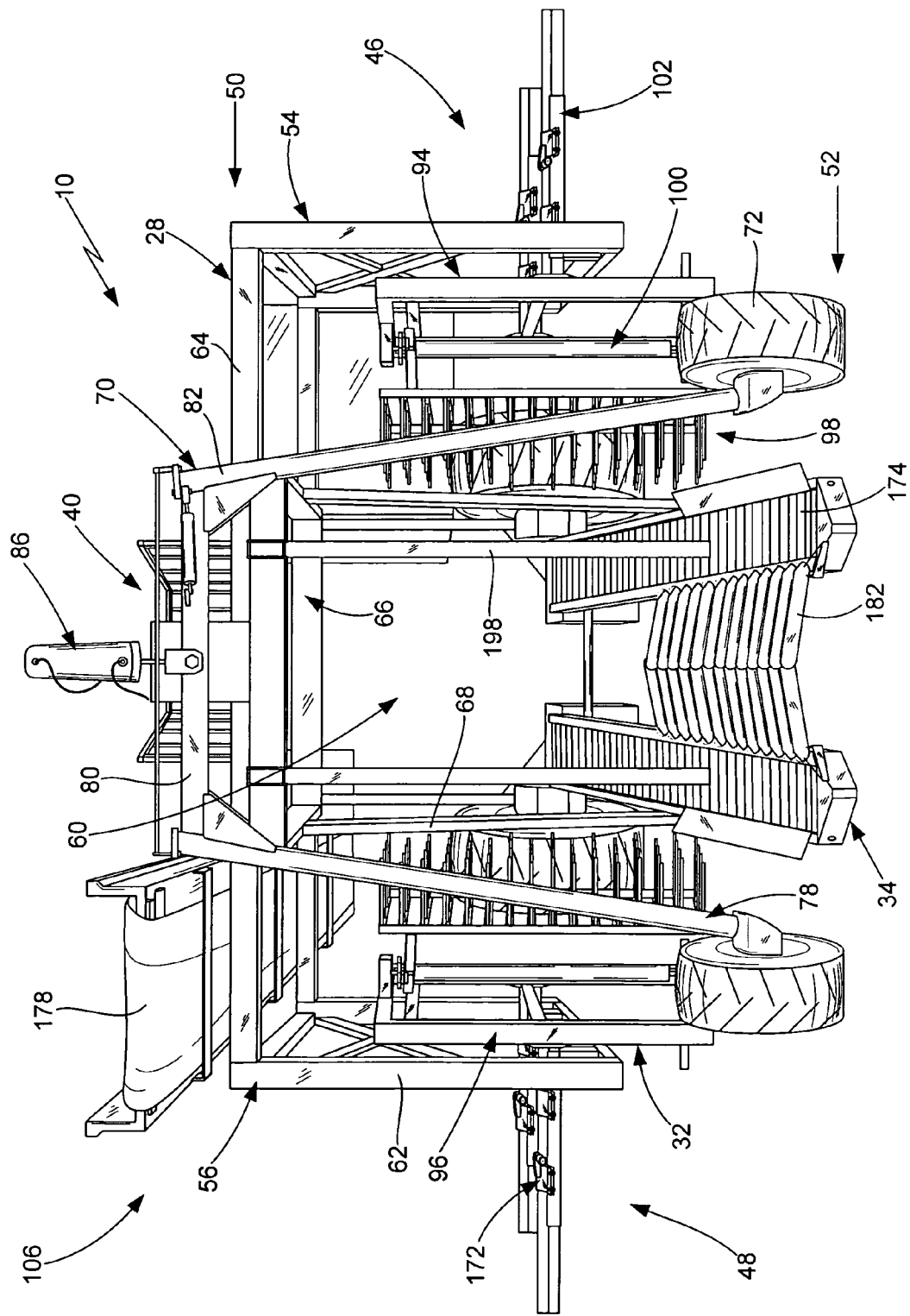
FIG. 5 is a front view of the harvesting machine of FIG. 4 with the lateral conveyor shown disposed generally frontward for moving the harvesting machine to and from an orchard.

Attached to main support frame 28 is a front wheel assembly 70 that rotatably connects to front wheels 72 at or near the front end 42 of harvesting machine 10 and a rear wheel assembly 74 that rotatably connects to rear wheels 76 at or near back end 44 of harvesting machine 10. In a preferred embodiment of the present invention, front wheel assembly 70 comprises a front frame 78 having a lateral frame member 80 and a pair of leg members 82 and 84 that extend generally downward from the ends of lateral frame member 80 to connect to the front wheel 72 at the bottom of each leg member 82/84. As best shown in FIGS. 4 and 5, front frame 78 has a generally inverted U-shaped configuration that does not interfere with or otherwise inhibit the placement of the open space 60 around the canopy 22 of tree 12 during use of harvesting machine 10. The front frame 78 of front wheel assembly 70 connects to the center support frame 66 of main support frame 28. In one embodiment, front frame 78 can be fixedly attached to main support frame 28. In the preferred embodiment, however, front frame 78 is moveably attached to main support frame 28 such that the main support frame 28 can move up and down relative to the front wheel assembly 70 so as to position the rods 26 of the picking mechanism 32 higher or lower inside harvesting area 60 so as to generally align the rods 26 with the canopy 22 in order to harvest the fruit 14 from the entire canopy 22 of tree 12. In addition, moving the main support frame 28 up or down moves the portion of conveying assembly 34 disposed below the open space 60 higher or lower relative to the ground and the bottom of the canopy 22 of tree 12 for movement to or among the row 24 of trees 12 for harvesting or moving the harvesting machine 10 to or from the orchard. In a preferred embodiment, harvesting machine 10 comprises a lift mechanism 86 that interconnects the front frame 78 of front wheel assembly 70 with the overhead frame 58 of main support frame 28 to allow the operator to move the main support frame 28, and the components attached thereto, up and down in relation to the front frame 78 of the front wheel assembly 70. In a preferred embodiment, lift mechanism 86 is a hydraulically powered assembly, examples of which are generally well known in the art, that is sized and configured to raise and lower the loads associated with main support frame 28, primary sub-frame 30 and various components that are attached to these frames 28/30, including the picking mechanism 32 and the lower portion of the conveying assembly 34.

As best shown in FIGS. 6 and 7, rear wheel assembly 74 comprises a rear frame 88 that rotatably supports the rear wheels 76. In the preferred embodiment, rear wheels 76 are connected by axle 90 and are driven by motor 38. In this embodiment, a rear-wheel drive system, the front wheels 72 are not connected to motor 38. Motor 38 may be an air cooled diesel engine or the like that is used to provide the power to move harvesting machine 10. As known to those skilled in the art, a variety of prime movers can be efficiently and effectively utilized for motor 10. As also known to those skilled in the art, motor 38 should be sized and configured to be able to move harvesting machine 10 through a orchard or other field under a variety of ground conditions, including dirt or muddy fields. In one embodiment, motor 38 is configured to provide all of the operational requirements harvesting machine 10, including the movement of the picking mechanism 32 in and out of the harvesting area 60 and canopy 22. In another embodiment, motor 38 is only utilized for the movement of harvesting machine 10 to/from the orchard, along the row of trees and between rows 24.

Figure 9:
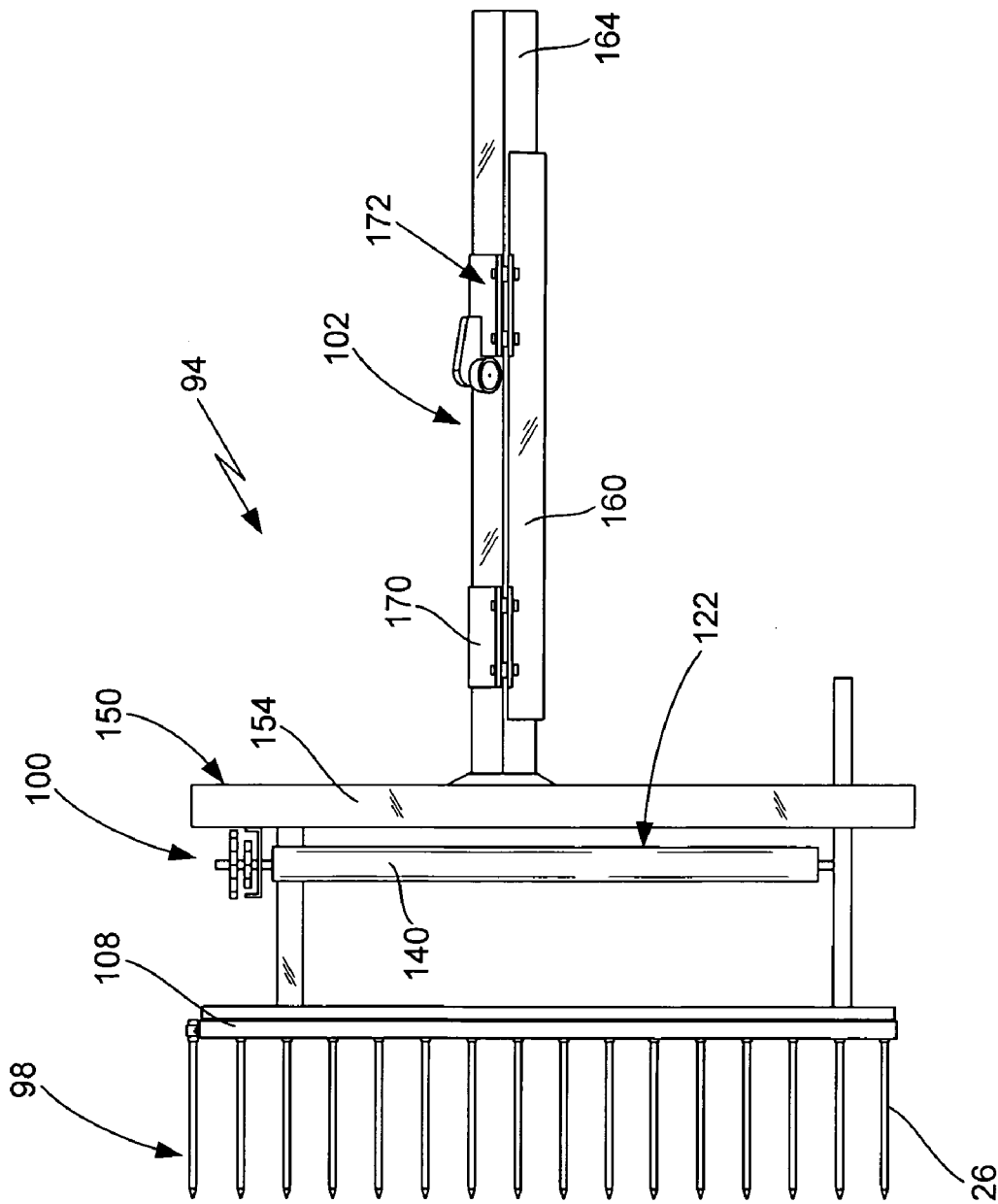
FIG. 9 is an isolated end view of the first picking assembly utilized with the preferred embodiment of the harvesting machine of the present invention.

Picking mechanism 32 comprises a first picking assembly 94 at the first side 46 of harvesting machine 10 and a second picking assembly 96 at the second side 48 of harvesting machine 10, as best shown in FIGS. 4 and 5. In the preferred embodiment of the harvesting machine 10 of the present invention, both first 94 and second 96 picking assemblies are configured substantially the same, each having a crop separating mechanism 98 that includes rods 26, a motion inducing mechanism 100 for imparting a snap-like oscillation/whipping motion to rods 26 and a canopy engaging mechanism 102 that moves the crop separating mechanism 98 into and out of engagement with the canopy 22 of tree 12, as best shown in FIG. 9 (for first picking assembly 94). For purposes of the present disclosure, the term "tree engaging position," shown as 104 in FIG. 1, is utilized to describe the harvesting machine 10 when the crop separating mechanism 98 is directed into the open harvesting area 60 to engage canopy 22 of tree 12 and the term "open position," shown as 106 in FIGS. 4 and 5, is utilized to describe harvesting machine 10 when crop separating mechanism 98 is pulled or retracted away from the harvesting area 60. As shown, picking assemblies 94 and 96 are supported by their respective first side frame 54 and second side frame 56 of the main support frame 28. As set forth in more detail below, canopy engaging mechanisms 102 of each of the pair of picking assemblies 94/95 move the crop separating mechanism 98 into the harvesting area 60 to insert the rods 26 into canopy 22 of tree 12 (tree engaging position 104), motion inducing mechanism 100 imparts a very short duration, typically approximately four to six seconds per tree 12, snap-like whipping motion to the rods 26 to separate fruit 14 from the tree 12 and the fruit 14 is received by conveying assembly 34 and conveyed to a storage container, such as bin 36. The motion inducing mechanism 100 is then turned off and then the crop separating mechanism 98 is retracted by the canopy engaging mechanism 102 to withdraw the rods from the canopy 22 to place the harvesting machine 10 it is open position 106 so that harvesting machine 10 may be moved from the harvested tree 12 to the next tree in the row 24, to the next row of trees or out of the orchard. In a preferred embodiment, the entire process of moving up to the tree 12, harvesting the fruit 14 therefrom and then moving to the next tree 12 will take approximately ten to twelve seconds. At this rate, it is anticipated that harvesting machine 10 will be able to harvest approximately 300 to 350 trees, or more, per hour.

Figure 11:
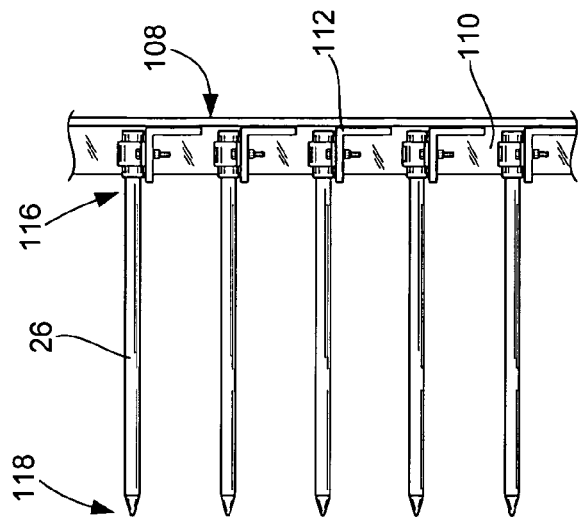
FIG. 11 is an end view of a portion of the crop dislodging mechanism of FIG. 10 taken through line 11-11 of FIG. 10 showing the rod support frame with a plurality of rods mounted thereto.
Figure 10:
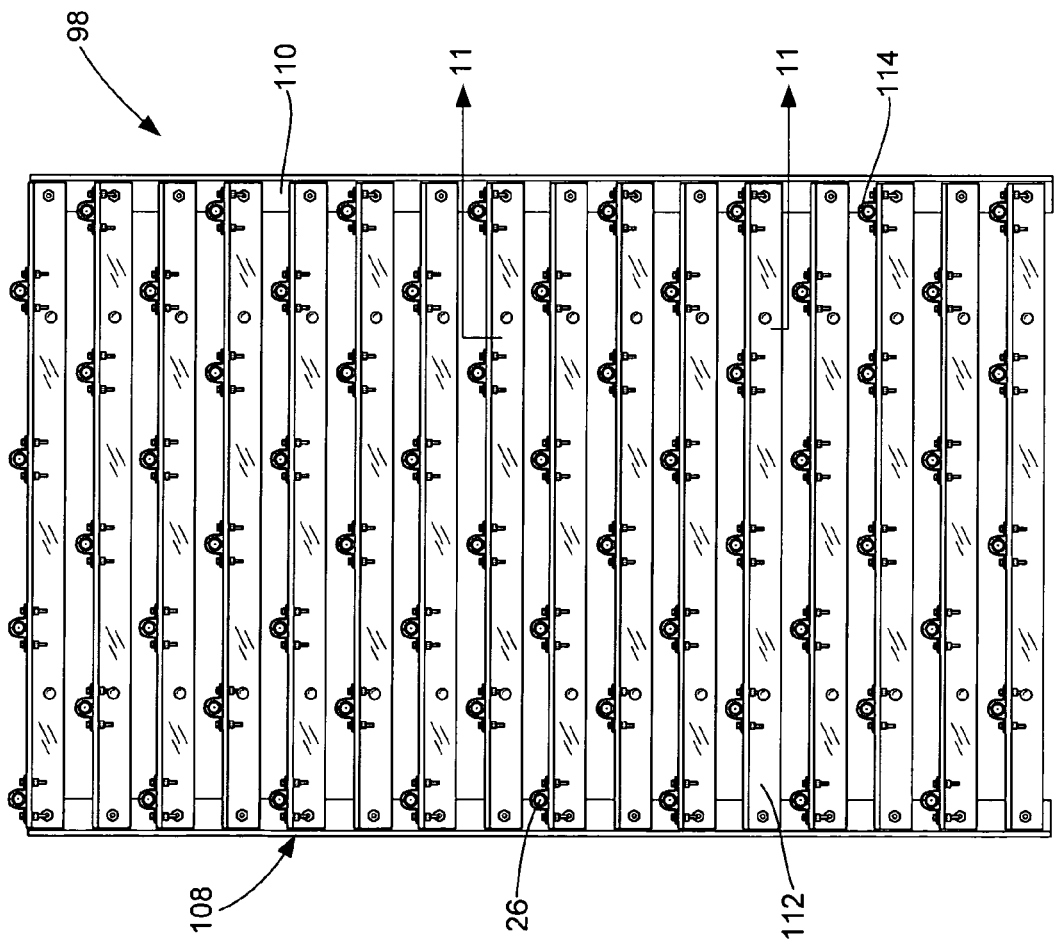
FIG. 10 is a side view the crop dislodging mechanism of FIG. 9 showing the distal ends of the rods directed toward the viewer.

In a preferred embodiment of harvesting machine 10, the crop separating mechanism 98 comprises a rod support frame 108, to which the rods 26 are mounted, that is attached to and moved into and out of the harvesting area 60 by canopy engaging mechanism 102, as best shown in FIGS. 10 and 11. In the embodiment shown in these figures, rod support frame 108 comprises a plurality of frame members, including the outer frame members 110 and rod support members 112, that support rods 26 in a manner that allows rods 26 to sufficiently flex to facilitate separation of the fruit 14 from tree 12 upon activation of motion inducing mechanism 100. The outer frame members 110 define the shape of rod support frame 108, which will typically be square or rectangular shaped, and the rod support members 112 support the rods 26. In a preferred embodiment, rod socket 114 receives and connects the individual rods 26 to their respective rod support members 112. The first or proximal end 116 of each rod 26 is securely received into one of the rod sockets 114. The second or distal end 118 of each rod 26 extends outwardly from the rod support frame 108, which is towards the harvesting area 60 when rod support frame 108 is mounted on harvesting machine 10, in a generally cantilever-like configuration so rods 26 will flex upon activation of the motion inducing mechanism 100. Preferably, the size and shape of rod support frame 108 is selected such that it will be sufficient to support a pattern of rods 26 that will extend substantially the full width and height of the typical tree 12 to be harvested by the harvesting machine 10 of the present invention. Although FIG. 10 shows a particular pattern of rods 26, those skilled in the art will readily appreciate that a variety of rod spacing patterns can be utilized with the harvesting machine 10 of the present invention.

In one preferred embodiment, rods 26 are made from a fiberglass material that is sufficiently stiff to accomplish the fruit-removal objectives of the present invention. Rods 26 should extend substantially straight outward from rod support frame 108 when not being oscillated and not excessively whip around when being oscillated. Other materials can be used for rods 26, including various metals, composites or polymers that provide sufficient flexibility and are able to withstand repeated contact against the canopy 22 of tree 12. Preferably, rods 26 are removably attached to sockets 114 and/or the sockets 114 are removably attached to the rod support members 112 so the user may replace any broken rods 26 as may be needed. In one embodiment, the rods 26 are generally round with a diameter of approximately one-half inch and they extend outward from the rod support frame 108 approximately ten to twelve inches. In other embodiments of harvesting machine 10, particularly depending on the trees 12 from which fruit 14 is being harvested and the material from which rods 26 are manufactured, the rods 26 can be greater or less diameter and length to achieve the desired motion of rods 26 and insertion into canopy 22. Rods 26 may be uniformly shaped along their length with a flat or rounded distal end 118. In a preferred embodiment, however, the tip of each rod 26 is rounded to avoid damaging the canopy 22 and the distal end 118 of each rod 26 is tapered to facilitate insertion of rod 26 into canopy 22. The tapered distal end 118 of rods 26 will help direct the rods 26 around the various limbs 18 in canopy 22 to prevent the insertion of rods 26 from being blocked by such limbs 18.

Motion inducing mechanism 100 is connected to the rod support frame 108 of crop separation mechanism 98 and moved therewith by canopy engaging mechanism 102. Various configurations of motion inducing mechanism 100 can be utilized to provide the desired snap-like, rapid oscillation force that is transmitted to the rods 26 through rod support frame 108 to cause rods 26 to whip against the secondary laterals 16 and limbs 18 to separate the fruit 14 from the tree 12. In a preferred embodiment of the harvesting machine 10 of the present invention, motion inducing mechanism 100 comprises a support frame 120 having a first rotatable weight assembly 122 at a first end 124 of support frame 120 and a second rotatable weight assembly 126 at a second end 128 of support frame 120, as best shown in FIG. 12. In this embodiment, support frame 120 has an upper cross member 130 and a lower cross member 132 that are held in spaced apart relation by one or more vertical support members 134. Each of first 122 and second 126 rotatable weight assemblies comprise an elongated shaft 136 that is rotatably connected at its ends to with a bearing 138 at each of the upper 130 and lower 132 cross members and one or more weight members 140 attached thereto so as to rotate with shaft 136 when it is rotated. Rotation of shafts 136 and weight members 140 is achieved, in a preferred embodiment, by a separate oscillation motor 142 that connects to one or more of rotatable weight assemblies 122/126 by one or more connecting members, such as first connecting member 144 and second connecting member 146, which each can be a standard linked chain or a cable, wire, belt or the like. Appropriate sprockets or other guides are utilized to transfer the rotational motion from oscillation motor 142 to the shafts 136. In the embodiment shown in FIG. 12, the motor 142, chains 144/146 and sprockets are disposed at the upper end of oscillation support frame 120. As will be readily apparent to those skilled in the art, various other components and arrangement of those components can be utilized to achieve the objectives of the motion inducing mechanism 100, which are set forth in more detail below, utilized with the harvesting machine 10 of the present invention.

As stated above, the purpose of motion inducing mechanism 100 is to transmit a short duration oscillation force to the flexibly mounted rods 26 to cause them to sufficiently oscillate or whip inside canopy 22 and substantially separate all of the fruit 14 from the tree 12. The desired rapid whipping motion causes a tree shaking-like motion that occurs much closer to the fruit 14, thereby providing a more intense whipping motion at secondary laterals 16 than would be possible if only shaking the trunk 20 of tree 12. Through various trial and error experiments, the inventor has found that a generally snap-like, rapid whipping motion, which is transmitted to the rods 26 through rod support frame 108, provided by motion inducing mechanism 100 best achieves the desired removal of fruit 14 from tree 12. To obtain the desired snap-like effect, the inventor has found that a quick, short duration imbalanced rotation of the weight members 140 is preferred. In the embodiment shown in the figures, the imbalanced rotation is achieved by offsetting the weight members 140 from their respective shafts 136 by utilizing one or more weight offset members 148 to connect the weight member 140 to the shaft 136, as shown in FIG. 12. Use of eccentrically disposed weight members 140 provides an oscillation or vibration motion that is transmitted to the rods 26 to whip them inside canopy 22. Although uniform positioning of the weight members 140 on shafts 136 could provide some of the benefits of the present invention, it is much preferred that there be a mixed oscillation motion to better achieve the snap-like, rapid whipping motion that has been found to be more effective at separating fruit 14 from tree 12.

In the preferred embodiment of the present invention the desired mixed oscillation motion is achieved by providing a non-uniform rotation cycle for the first weight assembly 122 relative to the second weight assembly 124 by offsetting the weight members 140 on shafts 136 differently and by linking the shafts 136 of the first 122 and second 124 weight assemblies in a manner that causes the shafts 136 to rotate at slightly different speeds. As an example, the offsetting of weight members 140 can be achieved by positioning one weight member 140 at a two o'clock position and one weight member 140 at a five o'clock position relative to shaft 136 (many different positions can be utilized). The shafts 136 can be linked to achieve non-uniform rotation by the connecting oscillation motor 142 to the shaft 136 of first weight assembly 122 with first connecting member 144 and then connecting that shaft 136 to the shaft 136 of second weight assembly 126 with second connecting member 146, as shown in FIG. 12, instead of connecting oscillation motor 142 directly and equally to both shafts 136. In addition, in the preferred embodiment the first 122 and second 124 weight assemblies are geared to achieve counter-rotation of the rotating weight members 140. By rotating in opposite directions, the rotation of weight members 140 will further add to the imbalanced rotation effect so as to achieve the desired mixed oscillation motion. The imbalanced rotation of the weight members 140, which has been found to be very important to the operation of harvesting machine 10, transmits a sharper, snap-like whipping action to rods 26, which are whipped against the secondary laterals 16 and limbs 18 to separate the fruit 14 from tree 12. On various tests with pomegranate trees, the inventor has found that even a short rotation time of approximately four seconds is sufficient to remove substantially all of the fruit 14 from the tree 12.

Figure 13:
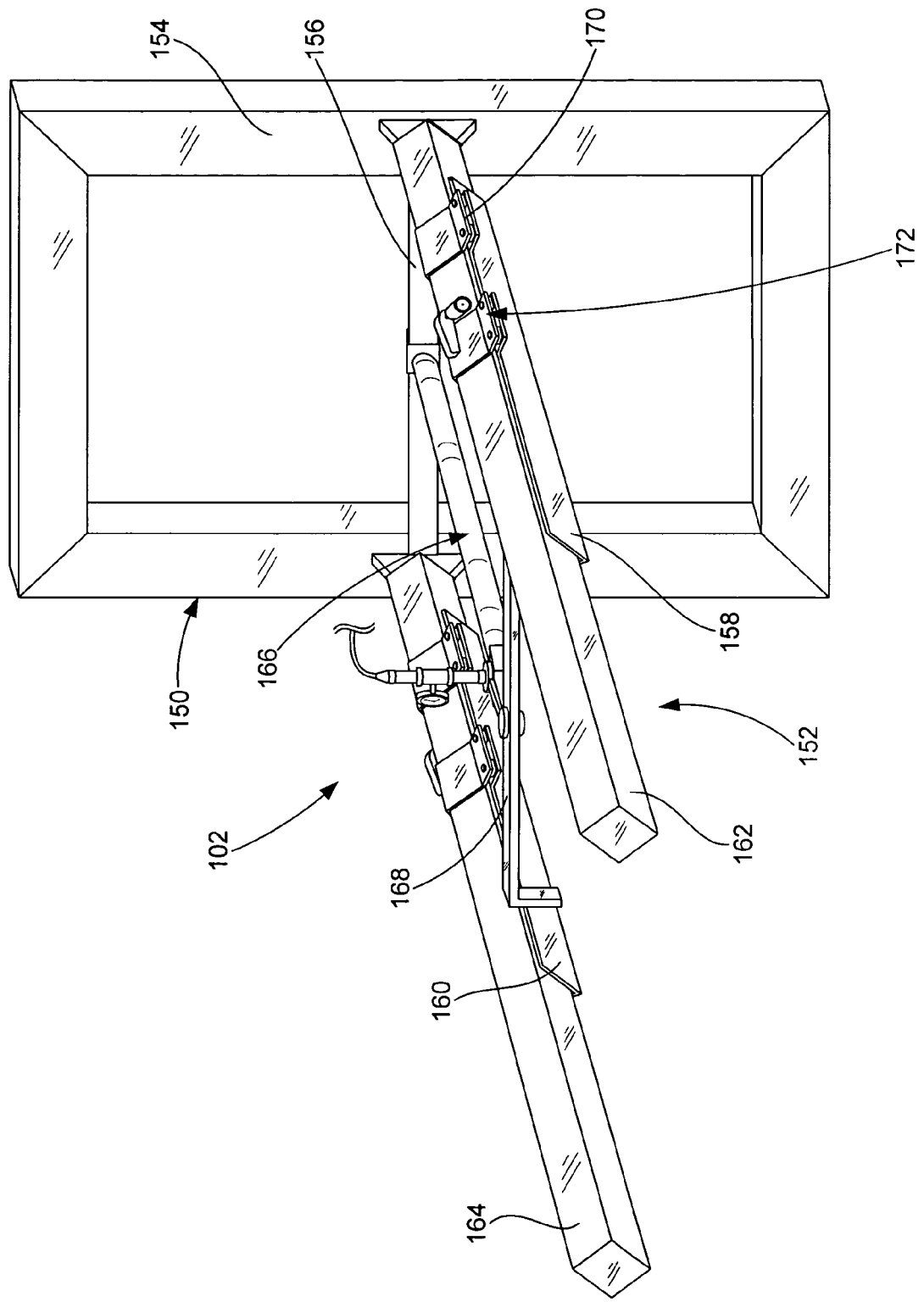
FIG. 13 is an isolated perspective view of the canopy engaging mechanism utilized with the preferred embodiment of the harvesting machine of the present invention.

To move the rods 26 of crop separating mechanism 98 into the harvesting area 60 for engagement with the canopy 22 of tree 12 and out of the canopy 22 and harvesting area 60, after separating the fruit 14 from tree 12, for movement to the next tree in a row 24, between rows 24 and to or from the orchard of trees, each of first 94 and second 96 picking assemblies of the harvesting machine 10 of the present invention utilizes canopy engaging mechanism 102. As will be readily apparent to those skilled in the art, the canopy engaging mechanism 102 must be configured to moveably support the crop separating mechanism 98 and, in the preferred embodiment, the motion inducing mechanism 100. To accomplish the above, canopy engaging mechanism 102 has a carrier frame 150 that attaches to and supports crop separating mechanism 98 and a slider assembly 152 that is attached to and capable of moving carrier frame 150 (and, therefore, crop separating mechanism 98) towards and away from the harvesting area 60. In a preferred embodiment, as best shown in FIGS. 4, 5 and 9, the motion inducing mechanism 100 is disposed between the carrier frame 150 and the crop separating mechanism 98. Carrier frame 150 comprises a plurality of frame members 154 configured to define a support structure that attaches to oscillation support frame 120, which in turn is attached to the rod support frame 108. Carrier frame 150 has a carrier brace member 156 that, in the preferred embodiment, is disposed generally horizontal across carrier frame 150. Also in the preferred embodiment, slider assembly comprises a pair of slider support members 158 and 160 that attach to and are supported by the first side frame 54 and second side frame 56 of primary sub-frame 30. Attached to and extending outwardly from opposite sides of the carrier frame 150 are a pair of slider members 162 and 164 that are configured to be slidably supported by slider support members 158 and 160, respectively, as best shown in FIG. 13. Disposed generally between slider support members 158/160 and slider members 162/164 is a hydraulically operated ram mechanism 166 that interconnects the carrier brace member 156 with a slider brace member 168, which is attached to and interconnects the pair of slider support members 158/160. In a preferred embodiment, slider support members 158/160 are right angled members that are turned to form a generally v-shaped support for the generally square shaped, in the preferred embodiment, slider members 162/164. To maintain the slider members 162/164 on slider support members 158/160, one or more slider braces 170 and/or one or more sliding brace mechanisms 172 are utilized. In the embodiment shown in the figures, one sliding brace 170 is attached to each of the slider support members 158/160 so as to extend over the top edge of the slider members 162/164 in a manner that prevents the slider members 162/164 from being disengaged from slider brace members 158/160. One sliding brace mechanism 172 is also attached to each slider support member 158/160 and configured to allow the slider members 162/164 while allowing them to slide relative to their respective slider support member 158/160. Although the slider support members 158/160 and slider members 162/164 can be made out of a variety of materials, in the preferred embodiment both of these components are made out of steel or other metals. The configuration shown in the figures and described above is intended to be exemplary of one of the possible configurations for a canopy engaging mechanism 102 that moves crop separating mechanism in and out of the harvesting area 60 and engagement with canopy 22 of tree 12.

In the preferred embodiment of harvesting machine 10 of the present invention, the canopy engaging mechanism 102 is configured to direct the crop separating mechanism 98 sufficiently against tree 12 to at least slightly compress the canopy 22, as shown in FIG. 1, in order to increase the effectiveness of the action of rods 26 in canopy 22. As stated above, canopy engaging mechanism 102 directs the rod support frame 108, by way of the carrier frame 150, into the harvesting area 60 where the canopy 22 of tree 12 is positioned. Although the canopy engaging mechanism 102 can be configured to stop with the rod support frame 108 at or near the outer edges of canopy 12 and longer length rods 26 be provided so they extend completely into canopy 22, in the preferred embodiment the canopy engaging mechanism 102 pushes the rod support frame 108 further inward so that the rod support frame 108 compresses the canopy 22 and shorter rods 26 are utilized. In either embodiment, the length of rods 26 should be such that the rods 26 extending inward from the first 94 and second picking assemblies will encompass the entire width of canopy 22 in which fruit 14 is located (in some circumstances, the opposite facing rods 26 will nearly contact each other). The compression of the canopy 22 is preferred, particularly with pomegranate trees, because this concentrates the energy from the whipped rods 26 and more effectively separates the fruit 14 from the tree 12. A loose canopy 22 will tend to dissipate the energy from rods 26 and, as a result, be less effective at separating the fruit 14 from the tree 12. The amount of compression of canopy 22 should be selected so as to not damage the tree 12 (e.g., breaking secondary laterals 16 and limbs 18). If desired, the tree can be pruned or otherwise grown along the sides, top and bottom to form a generally square or rectangular shaped canopy 22 that is sized to more readily fit into harvesting area 60 and be acted upon by the crop separating mechanism 98 of the present invention.

In one embodiment of the harvesting machine 10 of the present invention, the fruit 14 separated from tree 12 is allowed to fall onto the ground below the harvesting area 60. This configuration has the disadvantage of also requiring workers or another machine to follow behind harvesting machine 10 to collect the fruit 14 from the ground, which adds time and cost to the harvesting process. In addition, allowing the fruit 14 to drop to the ground can damage the fruit 14 by contact with the ground or by being run over by the rear wheels 76 of harvesting machine 10. To improve the economics of harvesting the fruit and avoid the potential damage problems, the harvesting machine 10 of the present invention also includes a conveying assembly 34 to collect and convey the fruit 14 to a bin 36 being moved alongside the harvesting machine 10, as shown in FIG. 14. The conveying assembly 34 utilized with a preferred embodiment of the harvesting machine 10 of the present invention comprises one or more lower conveyors 174, one or more rear conveyors 176 and one or more transfer conveyors 178 that operate together to collect the fruit separated from tree 12 and transfer it to bin 36 being pulled by a tractor 180 or other vehicle in the space adjacent the row 24 from which fruit 14 is being harvested by harvesting machine 10. As best shown in FIGS. 1, 4 and 5, a preferred embodiment of the present invention comprises a pair of lower conveyors 174 that collect the fallen fruit 14 that was separated from tree 12 in harvesting area 60 by crop separating mechanism 98 and moves the fruit 14 generally rearward (as shown in FIG. 1). The preferred embodiment also includes a plurality of spring-loaded conveyor ears 182, the operation of which are well known in the art, that are configured to open up around the trunk 20 of tree 12 as the tree 12 is straddled by harvesting machine 10 and then close around the trunk 20 as the conveyor ears 182 pass by the trunk 20 such that when tree 12 is in the harvesting area 60 conveyor ears 182 substantially bridge the gap between the pair of lower conveyors 174 and direct the fallen fruit 14 onto one of the two lower conveyors 174, as shown in FIG. 1. Once the fruit 14 is received onto the lower conveyors 174, it is directed rearward where, in the preferred embodiment, it is transferred to the pair of rear conveyors 176. The rear conveyors 176 carry the fruit generally upward so that it may be transferred to the transfer conveyor 178 for transfer to bin 36. As best shown in FIGS. 1, 4 through 6 and 8, the transfer conveyor 178 is located at the top side 50 of harvesting machine 10 so the fruit 14 may be transferred to the bin 36 without interfering with the tree 12 being received into the harvesting area 60 or the movement of harvesting machine 10 along the row 24 of trees 12, as best shown in FIG. 14. The lower conveyors 174, rear conveyors 176 and transfer conveyor 178 should be mounted to provide adequate tension so as to maintain a continuous moving surface, which may be generally flat or otherwise configured, for beneficially conveying the fruit 14 to bin 36. Additional plating, sheeting and guarding should be incorporated into harvesting machine 10 so as to minimize loss of fruit 14 during harvesting and to provide for safe use of harvesting machine 10.

As best shown in FIGS. 4 and 5, transfer conveyor 178 of conveying assembly 34 is preferably configured to pivot between its sideward facing position (FIG. 4) that is utilized when the user transfers the harvested fruit 14 to bin 34, as shown in FIG. 14, and a forward facing position (FIG. 5) that is useful for moving the harvesting machine 10 to the orchard of trees 12 and, in some circumstances, between rows 24 of trees 12 and for storing harvesting machine 10 when not in use. Because the transfer conveyor 178 faces forward, generally in-line with the longitudinal length of harvesting machine 10, when not in use, it will be much less likely to contact buildings, telephone poles or other objects that may be along the path that harvesting machine 10 will take as it moves to the orchard. Various types of pivoting mechanisms can be utilized with the harvesting machine 10 to pivot transfer conveyor 178 between its sideward and forward facing positions. In another embodiment of the present invention, not shown, the transfer conveyor 178 can be telescopically configured to allow the user to extend it when the harvesting machine 10 is being used to harvest fruit 14 from tree 12 and retract it when it is not needed, such as when it is being moved to/from the orchard or being stored for later use.

The harvesting machine 10 of the present invention has one or more power sources, such as the motor 38. If desired, a portion of the power from motor 38 can also be utilized to operate lift mechanism 86, motion inducing mechanism 100, canopy engaging mechanism 102 and the various conveyors utilized with the conveying assembly 34. In the preferred embodiment, motor 38 is primarily or exclusively utilized to propel the harvesting machine 10 to/from the orchard, along a row 24 of trees 12 and between rows 24. In this embodiment, harvesting machine 10 is provided with a separate hydraulic system 184, best shown in FIGS. 6 and 7, at its back end 44 that supplies hydraulic power to the lift mechanism 86, motion inducing mechanism 100, canopy engaging mechanism 102 and the various conveyors utilized with the conveying assembly 34 to operate the various mechanisms associated therewith. The hydraulic system 184 can include one or more hydraulic pumps 186 and one or more hydraulic fluid storage tanks 188 that are hydraulically connected to their associated components with appropriate hydraulic manifolds, lines and connectors, as well known to those skilled in the art.

The operator area 40 of the harvesting machine 10 is configured for a single operator to be able to operate each of the various components and functions of harvesting machine 10. The operator area 40, best shown in FIGS. 6 through 8, includes an operator seat 190 for the operator to sit on, a steering wheel 192 that allows the operator 56 to control the directional movement of harvesting machine 10 and a gear shifting and control mechanism 194 to allow the operator to control the operation of harvesting machine 10. As shown in the attached figures, the operator compartment 40 can be located at or near the back end 44 of harvesting machine 10 and be supported by the main support frame 28 behind the overhead frame members 64 of overhead frame 58. As known by those skilled in the art, the configuration of the operator area 40 must be such that the operator can see forward of the harvesting machine 10 so that he or she can safely (e.g., without colliding with objects) and efficiently move harvesting machine 10 to/from the orchard, along a row 24 of trees 12 and between rows 24. Although shown generally towards the back end 44 of harvesting machine 10, the operator area 40 can be located elsewhere on the harvesting machine 10, such as on the second side 34 or elsewhere on harvester frame 26, including at or near the front end 42 or along one of the sides 46/48 of harvesting machine 10. Preferably, the harvesting machine 10 also includes one or more barriers 196 around the operator area 40 to safely enclose the operator therein and protect him or her from falling off of harvesting machine 10. If desired, the operator area 40 may be fully enclosed by a shell or like structure. In a preferred embodiment of the harvesting machine 10 of the present invention, the steering wheel 192 operatively connects to a steering mechanism that is part of a front end having a trunnion assembly with a threaded shaft connecting both front wheels 72 at the front end 42 of harvesting machine 10. As stated above, rear wheels 76 at the back end 44 of harvesting machine 10 are operatively connected to and driven by motor 38 so as to provide the power to move harvester in a forward or rearward direction, as selected by the operator.

The preferred embodiment of the harvesting machine 10 of the present invention also includes one or more push bars 198 in front of harvesting area 60 to bend the limbs 18 of tree 12 out of the way as the harvesting machine straddles the tree 12. In the preferred embodiment, as best shown in FIGS. 4 and 5, harvesting machine 10 has at least two push bars 198, one on each side of the harvesting area 60. In the embodiment shown in the figures, the push bars 198 attach to and extend downward from the front cross-member of the center support frame 66 generally over the lower conveyors 174. The push bars 198 should be sufficiently rigid to push the limbs 18 of tree 12 aside as the canopy 22 of tree 12 is received into harvesting area 60. Bending the limbs 18 in this manner helps prevent damage to canopy 22 that could otherwise occur.

In use, the harvesting machine 10 of the present invention is moved to an orchard having one or more rows 24 of trees 12, such as pomegranate trees, that have fruit 14 thereon that is ready for harvesting. During the move to the orchard, harvesting machine 10 will typically be in its tree engaging position 104 and the transfer conveyor 178 will typically be in its forward facing position to reduce profile of harvesting machine 10 as much as possible. Once harvesting machine 10 is at the beginning of a row 24 and aligned with the trees 12 thereof, the operator will move the transfer conveyor 178 to its sideward facing position and operate the canopy engaging mechanism 102 to place harvesting machine 10 in its open position 106, thereby spreading crop separating mechanisms 98 of the first 94 and second 96 picking assemblies apart. The operator turns on the conveying assembly 34 to begin movement of the lower conveyors 174, rear conveyors 176 and transfer conveyor 178. Typically, the conveying assembly 34 is left on during at least the entire harvesting of row 24. The operator then drives the harvesting machine 10 forward to straddle the first tree 12 in row 24 while the driver of tractor 180, or other vehicle, in the space along row 24 positions bin 36 below the discharge of the transfer conveyor 178. When the canopy 22 of tree 12 is positioned inside harvesting area 60, the operator stops the forward progress of harvesting machine 10 and operates the canopy engaging mechanism 102 to move the crop separating mechanisms 98 of the first 94 and second 96 picking assemblies generally toward each other to place the harvesting machine in its tree engaging position 104. As the rods 26 of the crop separating mechanisms 98 enter the canopy 22 of tree 12, the operator continues operating the canopy engaging mechanism 102 until the distal ends 118 of the opposing rods 26 are near each other, or at least sufficiently inside canopy 22 where there is fruit 14, to compress the canopy 22 and concentrate the energy that will be transmitted by rods 26. Once the crop separating mechanisms 98 are in place, the operator then briefly (e.g., for approximately four seconds) operates the motion inducing mechanism 100 to rapidly oscillate the rods 26 to cause them to whip around with a snap-like motion inside the canopy 22. Contact against the secondary laterals 16 and limbs 18 of tree 12 will cause the fruit 14 to separate from tree 14 and fall downward onto conveyor ears 182, which have substantially enclosed the trunk 20 of tree 12 near the bottom 52 of harvesting machine 10. As soon as the motion inducing mechanism 100 is turned off, the operator operates the canopy engaging mechanism 102 to move the crop separating mechanisms of the first 94 and second 96 picking assemblies away from each other, thereby withdrawing the rods 26 thereof from canopy 22. With the crop separating mechanisms 98 moved outward, relative to harvesting area 60, and the harvesting machine 10 in its open position 106, the operator moves the harvesting machine 10 to the next tree 12 in the row 24 and repeats the above process. The fruit 14 from each of the trees 12 will be directed to the lower conveyors 174 where they will be moved to the rear conveyors 176 and then to the transfer conveyor 178 for transfer to the bin 36 being towed by tractor 180. Once the orchard is harvested, the operator places the harvesting machine 10 back in its lower profile harvesting position 104 and pivots the transfer conveyor 178 to its forward facing direction so that the harvesting machine 10 may be more easily moved from the orchard and to another orchard or storage. As set forth above, the operation of the motion inducing mechanism 100 will typically require approximately four to six seconds and the entire removal of fruit 14 from a tree 12 will require approximately ten to twelve seconds, allowing a single operator and a tractor driver to harvest an entire orchard at a rate of approximately 300 to 350, or more, trees per hour.

In an alternative configuration, the harvesting machine 10 of the present invention has at least the picking mechanism 32 component mounted on a rail or rail-like mechanism that allows the harvesting machine 10 to continuously move along the row of trees 24 while the picking mechanism 32 removes fruit 14 from a tree 12. In this configuration, picking mechanism 32 start near the front end 42 of the harvesting machine 10. The canopy 22 of the tree 12 would be positioned inside the harvesting area 60 and then the picking mechanism 32 would stop moving at tree 12 while the remaining components of the harvesting machine 10 continue moving forward. The operator would operate the first 94 and second 96 picking assemblies as set forth above to direct the rods 26 into the canopy and remove the fruit therefrom. Once the fruit 14 is removed from the first tree 12, the picking mechanism 32 slides forward on the rail mechanism to "catch-up" to the rest of the harvesting machine 10. Before harvesting machine 10 gets to the next tree, the picking mechanism 32 would be again at the front end 42 ready to engage the next tree and repeat the process. Preferably, the conveying assembly 34 would be configured such that the lower conveyors 174 would remain disposed under the harvesting area 60. Otherwise, at least the lower conveyors 174 would have to move with the picking mechanism 32.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the method of the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A harvesting machine for separating a crop from a canopy of a tree in a row of trees, the harvesting machine comprising:
   a main support frame configured to substantially straddle the tree as said harvesting machine moves along said row of trees, said main support frame supporting a primary sub-frame having a first side frame and a second side frame movably supported by said primary sub-frame, said first side frame and said second side frame defining a harvesting area therebetween, said harvesting area sized and configured to receive the canopy therein when said harvesting machine straddles the tree;
   a motor supported by said main support frame to drive one or more wheels rotatably disposed on opposite sides of said harvesting machine;
   a first picking assembly at said first side frame; and
   a second picking assembly at said second side frame, wherein each of said first picking assembly and said second picking assembly comprises a crop separating mechanism having a plurality of elongated rods positioned so as to dispose a distal end of each of said rods toward said harvesting area with said distal end of each of said rods of said first picking assembly disposed generally toward said distal end of each of said rods of said second picking assembly, a motion inducing means for imparting a short duration snap-like whipping motion to each of said rods and a canopy engaging mechanism configured to selectively move said harvesting machine between a tree engaging position with said rods of said first picking assembly and said rods of said second picking assembly directed into said harvesting area with said distal ends of said rods of said first picking assembly directed generally toward said distal ends of said rods of said second picking assembly so as to engage the canopy of the tree when the tree is disposed in said harvesting area and an open position with said distal ends of each of said rods of each of said first picking assembly and said second picking assembly retracted from said harvesting area and positioned generally outside of the canopy of the tree so as to substantially disengage said rods from said canopy after the crop is separated from the tree for movement of said harvesting machine along said row of trees.

2. The harvesting machine according to claim 1, wherein said crop are pomegranates and said tree is a pomegranate tree.

3. The harvesting machine according to claim 1 further comprising a conveying assembly attached to and supported by said main support frame, said conveying assembly configured to receive the crop separated from the tree and transfer the crop to a storage container.

4. The harvesting machine according to claim 3, wherein said conveying assembly comprises a lower conveyor, a rear conveyor and a transfer conveyor, said lower conveyor configured to receive the crop and move the crop to said rear conveyor, said rear conveyor configured to move the crop upward to said transfer conveyor, said transfer conveyor configured to the crop to said storage container above the tree.

5. The harvesting machine according to claim 1, wherein said canopy engaging mechanism is operatively connected to a source of power configured to move said canopy engaging mechanism between said tree engaging position and said open position.

6. The harvesting machine according to claim 1, wherein said crop separating mechanism further comprises a rod support frame attached to said motion inducing means, each of said rods flexibly supported by said rod support frame so as to generally oscillate or whip inside said canopy upon operation of said motion inducing means.

7. The harvesting machine according to claim 1 further comprising a front wheel assembly and a lift mechanism interconnecting said front wheel assembly and said support frame, said front wheel assembly having a lateral frame member, a pair of legs extending downward from said lateral frame member and a front wheel rotatably attached to each of said legs, said lift mechanism configured to raise and lower said crop separating mechanism in relation to said front wheel assembly.

8. The harvesting machine according to claim 1, wherein said motion inducing means comprises one or more weight assemblies supported by an oscillation support frame and configured to impart the whipping motion to said rods, each of said weight assemblies having a weight member disposed on a rotating shaft rotatably attached to said oscillation support frame so as to rotate said weight member, said motion inducing mechanism configured to generate a sharp, snap-like imbalanced rotation to whip said rods in the canopy of the tree.

9. The harvesting machine according to claim 8, wherein said motion inducing means further comprises one or more weight offset members interconnecting said weight member and said shaft so as to eccentrically dispose said weight members about said shafts.

10. The harvesting machine according to claim 8, wherein motion inducing means is operated for approximately four to six seconds to obtain said short duration snap-like whipping motion of said rods.

11. The harvesting machine according to claim 1, wherein said canopy engaging mechanism comprises one or more slider members each slidably supported on a corresponding slider support member, each of said slider support members supported by said primary sub-frame.

12. The harvesting machine according to claim 11, wherein said canopy engaging mechanism comprises a carrier frame configured to support said crop supporting mechanism, each of said slider members attached to said carrier frame.

13. The harvesting machine according to claim 12, wherein said canopy engaging mechanism further comprises a ram mechanism disposed between a carrier brace member of said carrier frame and a slider brace member interconnecting a pair of said slider support members.

14. The harvesting machine according to claim 1 further comprising an operator area supported by said main support frame, said operator support area having one or more seats, a steering wheel and a control mechanism.

15. A harvesting machine for separating a crop from a canopy of a tree in a row of trees, the harvesting machine comprising:
  a main support frame configured to substantially straddle the tree as said harvesting machine moves along said row of trees, said main support frame supporting a primary sub-frame having a first side frame, a second side frame and an overhead frame interconnecting said first side frame and said second side frame to define a harvesting area therebetween, said harvesting area sized and configured to receive the canopy therein when said harvesting machine straddles the tree;
  a motor supported by said main support frame to drive one or more wheels rotatably disposed on opposite sides of said harvesting machine;
  a first picking assembly at said first side frame;
  a second picking assembly at said second side frame,
  wherein each of said first picking assembly and said second picking assembly comprises a crop separating mechanism having a plurality of outwardly extending elongated rods flexibly supported by a rod support frame with said rods positioned so as to dispose a distal end of each of said rods toward said harvesting area with said distal end of each of said rods of said first picking assembly disposed generally toward said distal end of each of said rods of said second picking assembly a motion inducing means for imparting a short duration snap-like whipping motion to each of said rods and a canopy engaging mechanism to selectively move said harvesting machine between a tree engaging position with said rods of said first picking assembly and said rods of said second picking assembly directed into said harvesting area with said distal ends of each of said rods of said first picking assembly directed generally toward said distal ends of said second picking assembly so as to engage the canopy of the tree when the tree is disposed in said harvesting area and an open position with said distal ends of each of said rods of each of said first picking assembly and said second picking assembly retracted from said harvesting area and positioned generally outside of the canopy of the tree so as to substantially disengage said rods from said canopy after the crop is separated from the tree for movement of said harvesting machine along said row of trees;
  a conveying assembly attached to and supported by said main support frame, said conveying assembly configured to receive the crop separated from the tree and transfer the crop to a storage container; and
  an operator area supported by said main support frame, said operator support area having one or more seats, a steering wheel and a control mechanism.

16. The harvesting machine according to claim 15, wherein said conveying assembly comprises a lower conveyor, a rear conveyor and a transfer conveyor, said lower conveyor configured to receive the crop and move the crop to said rear conveyor, said rear conveyor configured to move the crop upward to said transfer conveyor, said transfer conveyor configured to the crop to said storage container above the tree.

17. The harvesting machine according to claim 15 further comprising a front wheel assembly and a lift mechanism interconnecting said front wheel assembly and said support frame, said front wheel assembly having a lateral frame member, a pair of legs extending downward from said lateral frame member and a front wheel rotatably attached to each of said legs, said lift mechanism configured to raise and lower said crop separating mechanism in relation to said front wheel assembly.

18. The harvesting machine according to claim 15, wherein said motion inducing means comprises one or more weight assemblies supported by an oscillation support frame and configured to impart the whipping motion to said rods, each of said weight assemblies having a weight member disposed on a rotating shaft rotatably attached to said oscillation support frame so as to rotate said weight member, said motion inducing means and configured so as to generate a sharp, snap-like imbalanced rotation to whip said rods in the canopy of the tree.

19. The harvesting machine according to claim 18, wherein motion inducing means is operated for approximately four to six seconds to obtains said sharp, snap-like imbalanced rotation.

20. A method of separating a crop from a canopy of a tree in a row of trees utilizing a harvesting machine configured to straddle the tree, said method comprising the steps of:
  a. positioning a harvesting area of the harvesting machine in alignment with the row of trees with the harvesting machine in an open position;
  b. moving the harvesting machine forward to dispose the canopy of the tree in the harvesting area, said harvesting area defined by a picking assembly at a first side of the harvesting machine and a second picking assembly at a second side of the harvesting machine, each of the first picking assembly and the second picking assembly comprising a crop separating mechanism having a plurality of rods positioned so as to dispose a distal end of each of the rods toward the harvesting area with the distal ends of each of the rods of the first picking assembly disposed generally toward the distal ends of each of the rods of the second picking assembly;
  c. operating a canopy engaging mechanism to move a distal end of each of the rods into the harvesting area to place the harvesting machine in a tree engaging position the rods disposed inside the canopy of the tree;

d. activating a motion inducing mechanism for approximately four to six seconds to impart a short duration, snap-like motion to the rods to cause the rods to oscillate or whip inside the canopy and separate the crop from the tree;

e. collecting the crop on a conveying assembly and moving the crop toward a storage container with the conveying assembly;

f. operating the crop engaging mechanism to move the distal ends of the rods of each of the first picking assembly and the second picking assembly out of the canopy of the tree so as to substantially disengage the rods from the canopy; and g. moving the harvesting machine forward along the row of trees while straddling the tree with the rods of the first picking assembly and the second picking assembly substantially not engaging the canopy of the tree to avoid damage to the tree.

* * * * *